(12) United States Patent
Komanduri et al.

(10) Patent No.: US 10,176,765 B2
(45) Date of Patent: Jan. 8, 2019

(54) ENHANCEMENTS OF A TRANSPARENT DISPLAY TO FORM A SOFTWARE CONFIGURABLE LUMINAIRE

(71) Applicant: ABL IP HOLDING LLC, Conyers, GA (US)

(72) Inventors: Ravi Komanduri, Dulles, VA (US); Rashmi Kumar Raj, Herndon, VA (US); An Mao, Reston, VA (US); Guan-Bo Lin, Reston, VA (US); Hampton Boone Maher, Washington, DC (US); Jonathan Lloyd Goodman, Herndon, VA (US); David P. Ramer, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 106 days.

(21) Appl. No.: 15/198,712

(22) Filed: Jun. 30, 2016

(65) Prior Publication Data
US 2018/0005590 A1  Jan. 4, 2018

(51) Int. Cl.
| G09G 3/34 | (2006.01) |
| F21S 8/04 | (2006.01) |
| F21V 3/02 | (2006.01) |
| F21V 7/00 | (2006.01) |
| F21V 23/00 | (2015.01) |
| H05B 37/02 | (2006.01) |

(Continued)

(52) U.S. Cl.
CPC .............. *G09G 3/3413* (2013.01); *F21S 8/04* (2013.01); *F21V 3/02* (2013.01); *F21V 7/0091* (2013.01); *F21V 23/003* (2013.01); *G09G 3/3426* (2013.01); *H05B 33/086* (2013.01); *H05B 37/0218* (2013.01); *H05B 37/0227* (2013.01); *H05B 37/0272* (2013.01); *F21Y 2115/10* (2016.08); *G09G 2320/0233* (2013.01); *G09G 2320/0666* (2013.01); *G09G 2360/144* (2013.01); *G09G 2360/16* (2013.01)

(58) Field of Classification Search
CPC ......... G09G 3/3413; G09G 2320/0233; H05B 37/0218; H05B 37/0227; F21S 8/04; F21V 3/02; F21V 7/0091; F21V 23/003; F21Y 2115/10
USPC ........................................................ 345/690
See application file for complete search history.

(56) References Cited

U.S. PATENT DOCUMENTS

| 5,785,404 A | * | 7/1998 | Wiese | ..................... F21V 5/02 362/459 |
| 8,892,822 B2 | | 11/2014 | Chou | |
| 2002/0101197 A1 | | 8/2002 | Lys et al. | |

(Continued)

OTHER PUBLICATIONS

International Search Report and Written Opinion of the International Searching Authority for International Application No. PCT/US2017/039738, dated Feb. 21, 2018, 19 pages.

*Primary Examiner* — Srilakshmi K Kumar
*Assistant Examiner* — Chineyere Wills-Burns
(74) *Attorney, Agent, or Firm* — RatnerPrestia

(57) ABSTRACT

The examples relate to various implementations of a software configurable lighting device, having an enhance display device that is able to generate light sufficient to provide general illumination of a space in which the lighting device is installed and provide an image display. The general illumination is provided by additional light sources and/or improved display components of the enhanced display device.

20 Claims, 8 Drawing Sheets

(51) Int. Cl.
*H05B 33/08* (2006.01)
*F21Y 115/10* (2016.01)

(56) References Cited

U.S. PATENT DOCUMENTS

| | | | |
|---|---|---|---|
| 2002/0126915 A1* | 9/2002 | Lai | G06T 7/001 382/296 |
| 2004/0113906 A1* | 6/2004 | Lew | G09G 3/3406 345/211 |
| 2006/0033972 A1 | 2/2006 | Takemori et al. | |
| 2007/0035706 A1 | 2/2007 | Margulis | |
| 2007/0103934 A1* | 5/2007 | Keh | G02B 6/0068 362/612 |
| 2007/0268695 A1 | 11/2007 | Seetzen | |
| 2008/0238856 A1 | 10/2008 | Bhowmik et al. | |
| 2009/0040564 A1* | 2/2009 | Granger | H04N 1/00 358/2.1 |
| 2009/0067156 A1* | 3/2009 | Bonnett | G02B 6/0068 362/97.2 |
| 2010/0232000 A1* | 9/2010 | Futterer | G02B 26/005 359/9 |
| 2010/0321414 A1* | 12/2010 | Muroi | G09G 3/3413 345/690 |
| 2012/0127128 A1* | 5/2012 | Large | G06F 3/0425 345/175 |
| 2012/0133673 A1* | 5/2012 | Ninan | G02F 1/133603 345/599 |
| 2012/0154422 A1* | 6/2012 | Ninan | G02B 27/2264 345/589 |
| 2013/0063496 A1* | 3/2013 | Basler | G09G 3/003 345/690 |
| 2013/0076798 A1 | 3/2013 | Wang et al. | |
| 2013/0106856 A1 | 5/2013 | Kuhlman et al. | |
| 2013/0257290 A1* | 10/2013 | Kurita | G09G 3/3426 315/152 |
| 2014/0043370 A1 | 2/2014 | Payne et al. | |
| 2015/0289344 A1 | 10/2015 | Leadford et al. | |
| 2015/0345724 A1* | 12/2015 | Leadford | H05B 33/086 362/244 |
| 2016/0171916 A1* | 6/2016 | Buckley | G09G 3/2003 345/692 |
| 2016/0349435 A1* | 12/2016 | Hsiao | G02F 1/1335 |

* cited by examiner

ENHANCEMENTS OF A TRANSPARENT DISPLAY TO FORM A SOFTWARE CONFIGURABLE LUMINAIRE

TECHNICAL FIELD

The present subject matter relates to lighting devices or luminaires, and to configurations and/or operations thereof, whereby a lighting device that is configurable by software, e.g. to emulate a variety of different lighting devices, uses an enhanced display device.

BACKGROUND

Electrically powered artificial lighting has become ubiquitous in modern society. Electrical lighting devices are commonly deployed, for example, in homes, buildings of commercial and other enterprise establishments, as well as in various outdoor settings.

In conventional lighting devices, the luminance output can be turned ON/OFF and often can be adjusted up or dimmed down. In some devices, e.g. using multiple colors of light emitting diode (LED) type sources, the user may be able to adjust a combined color output of the resulting illumination. The changes in intensity or color characteristics of the illumination may be responsive to manual user inputs or responsive to various sensed conditions in or about the illuminated space. The optical distribution of the light output, however, typically is fixed. Various different types of optical elements are used in such lighting devices to provide different light output distributions, but each type of device has a specific type of optic designed to create a particular light distribution for the intended application of the lighting device. The dimming and/or color control features do not affect the distribution pattern of the light emitted from the luminaire.

To the extent that multiple distribution patterns are needed for different lighting applications, multiple luminaires must be provided. To meet the demand for different appearances and/or different performance (including different distributions), a single manufacturer of lighting devices may build and sell thousands of different luminaires.

Some special purpose light fixtures, for example, fixtures designed for stage or studio type lighting, have implemented mechanical adjustments. Mechanically adjustable lenses and irises enable selectable adjustment of the output light beam shape, and mechanically adjustable gimbal fixture mounts or the like enable selectable adjustment of the angle of the fixture and thus the direction of the light output. The adjustments provided by these mechanical approaches are implemented at the overall fixture output, provide relatively coarse overall control, and are really optimized for special purpose applications, not general lighting.

There have been more recent proposals to develop lighting devices offering electronically adjustable light beam distributions, using a number of separately selectable/controllable solid state lamps or light engines within one light fixture. In at least some cases, each internal light engine or lamp may have an associated adjustable electro-optic component to adjust the respective light beam output, thereby providing distribution control for the overall illumination output of the fixture.

Although the more recent proposals provide a greater degree of distribution adjustment and may be more suitable for general lighting applications, the outward appearance of each lighting device remains the same even as the device output light distribution is adjusted. There may also be room for still further improvement in the degree of adjustment supported by the lighting device.

There also have been proposals to use displays or display-like devices mounted in or on the ceiling to provide variable lighting. The Fraunhofer Institute, for example, has demonstrated a lighting system using luminous tiles, each having a matrix of red (R) LEDs, green (G), blue (B) LEDs and white (W) LEDs as well as a diffuser film to process light from the various LEDs. The LEDs of the system were driven to simulate or mimic the effects of clouds moving across the sky. Although use of displays allows for variations in appearance that some may find pleasing, the displays or display-like devices are optimized for image output and do not provide particularly good illumination for general lighting applications. A display typically has a Lambertian output distribution over substantially the entire surface area of the display screen, which does not provide the white light intensity and coverage area at a floor or ceiling height offered by a similarly sized ceiling-mounted light fixture. Liquid crystal displays (LCD) also are rather inefficient. For example, backlights in LCD televisions have to produce almost ten times the amount of light that is actually delivered at the viewing surface. Therefore, any LCD displays that are to be used as lighting products need to be more efficient than typical LCD displays for the lighting device implementation to be commercially viable.

Other proposals have been directed to utilizing transparent image displays that allow an image to be displayed while remaining at least partially transparent. In particular, such transparent image display is collocated with a general illumination device and illumination generated by the general illumination device "passes through" the transparent image display. However, existing transparent image displays tend to offer unacceptable trade-offs between various criteria such as transparency, brightness, contrast ratio, and resolution. For example, a transparent image display may offer high transparency, but only moderate resolution. In another example, a transparent image display may offer high resolution, but low transparency or a limited color gamut. As such, existing transparent image displays are not optimal for combination with a general illumination device.

SUMMARY

Hence, there is room for further improvement in lighting devices based on display devices.

An example of lighting device as disclosed herein includes an image display, a general illumination device collocated with the image display device, a driver system, a memory with programming in the memory, and a processor. The driver system is coupled to the general illumination device to control light generated by the general illumination device. The driver system is also coupled to the image display device to control display of an image. The processor has access to the memory and is coupled to the driver system. The processor when executing the programming configures the lighting device to perform functions. The functions include obtaining an image selection and a general lighting generation selection as software control data. The image selection is transformed based on a desired color characteristic distribution. The general lighting generation selection is modified based on the transformed image selection. Based on the transformed image selection, an image output is presented via the image display device. Operation of the general illumination device is controlled by the processor via the driver system to emit light for general illumination from the general illumination device according to the modified general lighting generation selection.

In some examples, a lighting device is provided that includes a transparent image display device for presenting an image, a general illumination device collocated with the transparent image display device, and collimating optics located between the transparent image display device and the general illumination device. The general illumination device includes an array of LEDs. The transparent image display device includes a first set of LED strips oriented in a first direction and a second set of LED strips oriented in a second direction perpendicular to the first direction. Each LED strip includes a number of LEDs evenly spaced along the respective LED strip. The first set of LED strips and the second set of LED strips form a grid. The general illumination device is located behind the transparent image display device such that illumination generated by any one LED of the array of LEDs passes between some number of LEDs of the grid of evenly spaced LEDs.

Some of the described examples disclose a method including obtaining an image selection and a general lighting generation selection. The method further includes transforming the image selection based on a desired color characteristic distribution and modifying the general lighting generation selection based on the transformed image selection. As part of the method, an image output based on the transformed image selection is presented via a transparent image display device and a general illumination device located behind the transparent image display device is controlled to emit light for general illumination based on the modified general illumination generation selection.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
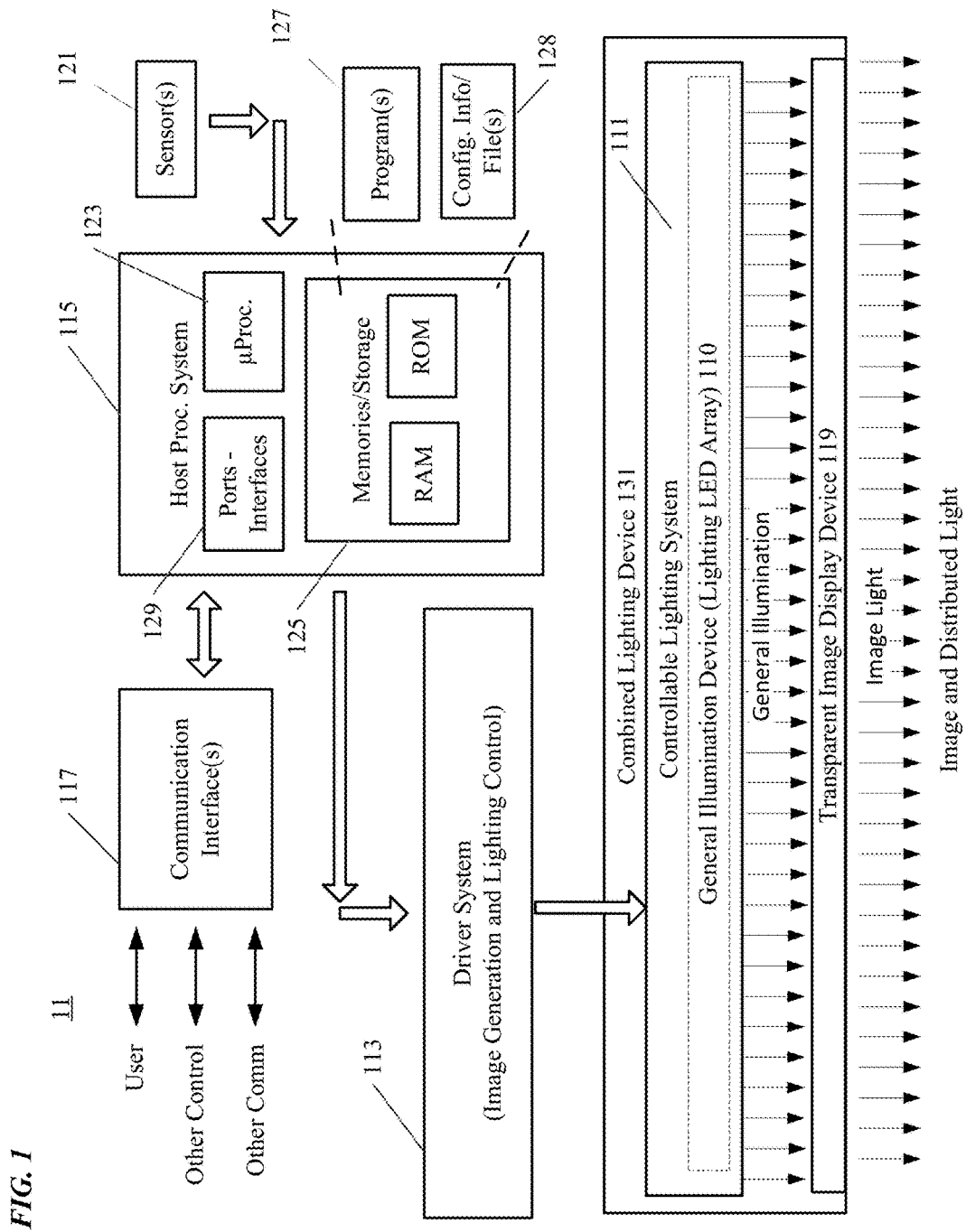
FIG. 1 is high-level functional block diagram of an example of a software configurable lighting apparatus.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The examples described in detailed below and shown in the drawings typically implement one or more techniques to enhance currently existing display technologies to provide the dual functionality of a display and luminaire, particularly in a manner to more effectively support luminaire type general lighting applications.

Some examples describe luminaires that include display devices that produce an image display output and implement techniques to enable the display device and illumination component(s) to work together to produce an illumination light output with industry acceptable performance for a general lighting application of a luminaire. Examples of methods to enable the display device to suitably contribute to an illumination light include, but are not limited to, one or more of an enhanced transparent image display device.

Image displays that use liquid crystals (LC) as an element of the display usually suffer high optical losses. For example, the final light output is usually less than 10% of what was originally produced by the Back-Light Unit. This reduces the efficiency of an image display to the extent that the display's illumination efficiency cannot compare with standard luminaire efficiencies which are in the range of 100 lumens/watt. In fact, most LCD based image displays cannot perform better than 10 lumens/watt. In other words, the general illumination performance of a conventional LCD based image display does not satisfy minimal lighting requirements set by building codes or industry standards, such as Illuminating Engineering Society (IES) and American National Standards Institute (ANSI) standards. Other display technologies, such as projection displays, LED-LCD or plasma displays are optimized for the display function and offer poor illumination efficiency, and thus are similarly unsuited to general lighting. In addition, many displays usually use combinations of narrow bandwidth emitters as the sources, therefore the light output is not spectrally filled as one would expect from a typical white light luminaire. This directly relates to metrics such as CRI and R9. As a result, an image display alone is a poor substitute for a standard luminaire.

Beam shape is another issue when using an image display for lighting purposes. Luminaires, which are typically mounted in ceilings, are specifically designed to cover the lighting solid angle appropriate to throw light on a work surface or the like within a room. For example, downlights have a narrow beam cone, while other lights may disburse the light over a wider area of the room. Conversely, image displays are designed with the intention of covering a broad viewing angle. The light output by an image display at the broad viewing angle is considered wasteful from a luminaire's perspective. For this additional reason, image displays are not typically considered as effective alternatives to a dedicated light fixture for general lighting purposes.

To overcome the above limitations, a combined lighting device includes, for example, a transparent image display device and a controllable lighting system. In addition, such combined lighting device and/or related components within a luminaire is configured, for example, to transform an image selection and/or modify a general illumination generation selection such that output of the transparent image display device produces a desired image and illumination generated by the controllable lighting system appropriately illuminates a space. A software configurable lighting device, installed for example as a panel, offers the capability to emulate a variety of different lighting devices while presenting any desired appearance via image display.

Reference now is made in detail to the examples illustrated in the accompanying drawings and discussed below. As shown in FIG. 1, the controllable lighting system 111 provides general illumination lighting via general illumination device 110 in response to lighting control signals received from the driver system 113. Similarly, the transparent image display device 119 provides image light in response to image control signals received from the driver system 113. In addition or alternatively, the image data may be provided to the image display device 119 from an external source(s) (not shown), such as a remote server or an external memory device via one or more of the communication interfaces 117. The elements 111, 110 and 119 are collocated to form combined lighting device 131 and are controlled by the respective control signals received from the driver system 113.

The transparent image display device 119 may be either a commercial-off-the-shelf image display device or an enhanced transparent image display device (described in more detail in the following examples) that allows general illumination lighting generated by general illumination device 110 to pass through. The general illumination lighting alone or in combination with light output from the display illuminates a space in compliance with governmental building codes and/or industry lighting standards. The image display device 119 is configured to present an image. The presented image may be a real scene, a computer generated scene, a single color, a collage of colors, a video stream, or the like.

In several examples, the general illumination device 110 includes a lighting LED array configured to provide light for the general illumination function. The controllable lighting system 111 is collocated with the image display device 119 to form a combined lighting device 131. However, as mentioned above and discussed in greater detail below, image display and general illumination generation are often conflicting functions that, when performed by combined lighting device 131, require modification and transformation to produce acceptable results.

In one example of the operation of the lighting device, the processor 123 receives a configuration file 128 via one or more of communication interfaces 117. The processor 123 may store, or cache, the received configuration file 128 in storage/memories 125. The configuration file 128 includes configuration data that indicates, for example, an image for display by the image display device 119 as well as a general lighting generation selection. A general lighting generation selection includes, for example, lighting settings for light to be provided by the controllable lighting system 111. Using the indicated image data, the processor 123 may retrieve from memory 125 stored image data and, based on a desired color characteristic distribution consistent with the lighting settings of the general lighting generation selection, transform image data to produce transformed image data. That is, as discussed in greater detail below, the image selection is transformed such that an output of the image display device 119, in combination with light generated by the controllable lighting system 111, results in a desired image and desired general illumination. The transformed image data is then delivered to the driver system 113.

The driver system 113 may deliver the transformed image data directly to the image display device 119 for presentation or may have to convert the image data into a format suitable for delivery to the image display device 119. For example, the transformed image data may be video data formatted according to compression formats, such as H.264 (MPEG-4 Part 10), HEVC, Theora, Dirac, RealVideo RV40, VP8, VP9, or the like, and still transformed image data may be formatted according to compression formats such as Portable Network Group (PNG), Joint Photographic Experts Group (JPEG), Tagged Image File Format (TIFF) or exchangeable image file format (Exif) or the like. For example, if floating point precision is needed, options are available, such as OpenEXR, to store 32-bit linear values. In addition, the hypertext transfer protocol (HTTP), which supports compression as a protocol level feature, may also be used.

Each general lighting generation selection includes software control data to set the light output parameters of the software configurable lighting device at least with respect to the controllable lighting system 111. As mentioned, the configuration information in the file 128 may specify operational parameters of the controllable lighting system 111, such as light intensity, light color characteristic, image parameters and the like, as well as the operating state of any light processing and modulation components of the controllable lighting system 111. The processor 123 by accessing programming 127 and using software configuration information 128, from the storage/memories 125, modifies operational parameters of the general lighting generation selection based on the transformed image data to create a modified general lighting generation selection. The processor 123 controls, based on the modified general lighting generation selection, operation of the driver system 113, and through that system 113 controls the controllable lighting system 111. For example, the processor 123 obtains light intensity distribution control data as part of the general lighting generation selection from the configuration file 128. In turn, processor 123 modifies the obtained light intensity distribution control data of the general lighting generation selection based on transformed image data to be displayed by transparent image display device 119. Next, processor 123 uses that modified control data to control the driver system 113 to set operating states of the light processing and modulation components of the controllable lighting system 111. For example, driver system 113 drives controllable lighting system 111 to control output of general illumination device 110 to produce a selected distribution of varying intensities of LEDs within general illumination device 110, e.g. to achieve a predetermined light generation for a general illumination application of a luminaire.

In other examples, the driver system 113 is coupled to the memory 125, the image display device 119 and the controllable lighting system 111 to control light generated by the image display device 119 and the controllable lighting system 111 based on the configuration data 128 stored in the memory 125. In such an example, the driver system 113 is configured to access configuration data 128 stored in the memory 125 and generate control signals for presenting a transformed image on the image display device 119 and control signals based on a modified general lighting generation selection for generating light for output from the general illumination device 110. For example, the image display device 119 includes inputs coupled to the driver system 113 for receiving image data according to the configuration data 128 stored in the memory. Examples of the image data includes video data or still image data stored in the memory 125. The driver system 113 may also deliver control signals for presenting the image on the image display device 119 that are generated based on the received image data.

The first drawing also provides an example of an implementation of the high layer logic and communications elements and one or more drivers to drive the combined lighting device 131 to provide a selected distribution of light intensities, e.g. for a general illumination application. As shown in FIG. 1, the lighting device 11 includes a driver system 113, a host processing system 115, one or more sensors 121 and one or more communication interface(s) 117.

The host processing system 115 provides the high level logic or "brain" of the device 11. In the example, the host processing system 115 includes data storage/memories 125, such as a random access memory and/or a read-only memory, as well as programs 127 stored in one or more of the data storage/memories 125. Such programs 127 include, for example, instructions necessary to perform transformation of an image selection and/or modification of a general lighting generation selection. The data storage/memories 125 store various data, including lighting device configuration information 128 or one or more configuration files containing such information, in addition to the illustrated programming 127. The host processing system 115 also includes a central processing unit (CPU), shown by way of example as a microprocessor (μP) 123, although other processor hardware may serve as the CPU.

The ports and/or interfaces 129 couple the processor 123 to various elements of the device 11 logically outside the host processing system 115, such as the driver system 113, the communication interface(s) 117 and the sensor(s) 121. For example, the processor 123 by accessing programming 127 in the memory 125 controls operation of the driver system 113 and other operations of the lighting device 11 via one or more of the ports and/or interfaces 129. In a similar fashion, one or more of the ports and/or interfaces 129 enable the processor 123 of the host processing system 115 to use and communicate externally via the interfaces 117; and the one or more of the ports 129 enable the processor 123 of the host processing system 115 to receive data regarding any condition detected by a sensor 121, for further processing.

In the examples, based on its programming 127, the processor 123 processes data retrieved from the memory 123 and/or other data storage, and responds to light output parameters in the retrieved data to control the combined lighting device 131. The light output control also may be responsive to sensor data from a sensor 121. The light output parameters may include light intensity and light color characteristics in addition to spatial modulation (e.g. steering and/or shaping and the like for achieving a desired spatial distribution).

As noted, the host processing system 115 is coupled to the communication interface(s) 117. In the example, the communication interface(s) 117 offer a user interface function or communication with hardware elements providing a user interface for the device 11. The communication interface(s) 117 may communicate with other control elements, for example, a host computer of a building control and automation system (BCAS). The communication interface(s) 117 may also support device communication with a variety of other systems of other parties, e.g. the device manufacturer for maintenance or an on-line server for downloading of virtual luminaire configuration data.

As outlined earlier, the host processing system 115 also is coupled to the driver system 113. The driver system 113 is coupled to the combined lighting device 131 to control one or more operational parameter(s) of the light output generated by the controllable lighting system 111. Although the driver system 113 may be a single integral unit or implemented in a variety of different configurations having any number of internal driver units, the example of system 113 may include a separate general illumination device and a spatial modulator driver circuit (not shown) and a separate image display driver (not shown). The separate drivers may be circuits configured to provide signals appropriate to the respective type of light source and/or modulators of the combined lighting device 131 utilized in the particular implementation of the device 11, albeit in response to commands or control signals or the like from the host processing system 115.

The host processing system 115 and the driver system 113 provide a number of control functions for controlling operation of the lighting device 11. In a typical example, execution of the programming 127 by the host processing system 115 and associated control via the driver system 113 configures the lighting device 11 to perform functions, including functions to operate the general illumination device 110 to provide light output from the lighting device and to operate the controllable lighting system 111 to steer and/or shape the light output from the source so as to distribute the light output from the lighting device 11 to emulate a lighting distribution of a selected one of a number of types of luminaire, based on the lighting device configuration information 128.

Apparatuses implementing functions like those of device 11 may take various forms. In some examples, some components attributed to the lighting device 11 may be separated from the combined lighting device 131. For example, an apparatus may have all of the above hardware components on a single hardware device as shown or in different somewhat separate units. In a particular example, one set of the hardware components may be separated from the combined lighting device 131, such that the host processing system 115 may run several similar systems of sources and modulators from a remote location. Also, one set of intelligent components, such as the microprocessor 123, may control/drive some number of driver systems 113 and associated combined lighting devices 131. It also is envisioned that some lighting devices may not include or be coupled to all of the illustrated elements, such as the sensor(s) 121 and the communication interface(s) 117. For convenience, further discussion of the device 11 of FIG. 1 will assume an intelligent implementation of the device that includes at least the illustrated components.

In addition, the device 11 is not size restricted. For example, each device 11 may be of a standard size, e.g., 2-feet by 2-feet (2×2), 2-feet by 4-feet (2×4), or the like, and arranged like tiles for larger area coverage. Alternatively, the device 11 may be a larger area device that covers a wall, a part of a wall, part of a ceiling, an entire ceiling, or some combination of portions or all of a ceiling and wall.

In an operation example, the processor 123 receives a configuration file 128 via one or more of communication interfaces 117. The configuration file 128 indicates a user selection of a general lighting generation selection to be provided by the configurable lighting device 11. The processor 123 may store the received configuration file 128 in storage/memories 125. The configuration information in the file 128 may specify operational parameters of a light source installed in the controllable lighting system 111 and/or the image display device 119, such as light intensity, light color characteristic, image parameters and the like, as well as any operating state of light processing and modulation components (if installed) of the controllable lighting system 111. The processor 123 by accessing programming 127 and using software configuration information 128, from the storage/memories 125, controls operation of the driver system 113, and through that system 113 controls the general illumination device 110 and the controllable lighting system 111. For example, the processor 123 obtains light intensity distribution control data from a configuration file 128, modifies the obtained light intensity distribution control data based on a transformed image to be displayed via image display device 119, and uses that modified control data to control the driver system 113 to cause the display of the transformed image and also set operating states of the light processing and modulation components of the controllable lighting system 111 to control output of the general illumination device 110 to produce a distribution of varying intensities of LEDs within general illumination device 110, e.g. to achieve a predetermined image presentation and a predetermined light distribution for a general illumination application of a luminaire.

Lighting equipment like that disclosed in the examples of FIG. 1 may be used in combinations of an image display device and other light sources, e.g. as part of the same fixture for general illumination, but not part of or integrated into the image display device. Although the image display device and general illumination device may be of any of the various respective types described here, for discussion purposes, we will use an example of a fixture that has an image display combined with a general illumination device, i.e., a controllable additional light source. For this purpose, 1A illustrates examples of components to be included in a combined lighting device 131.

Figure 1A:
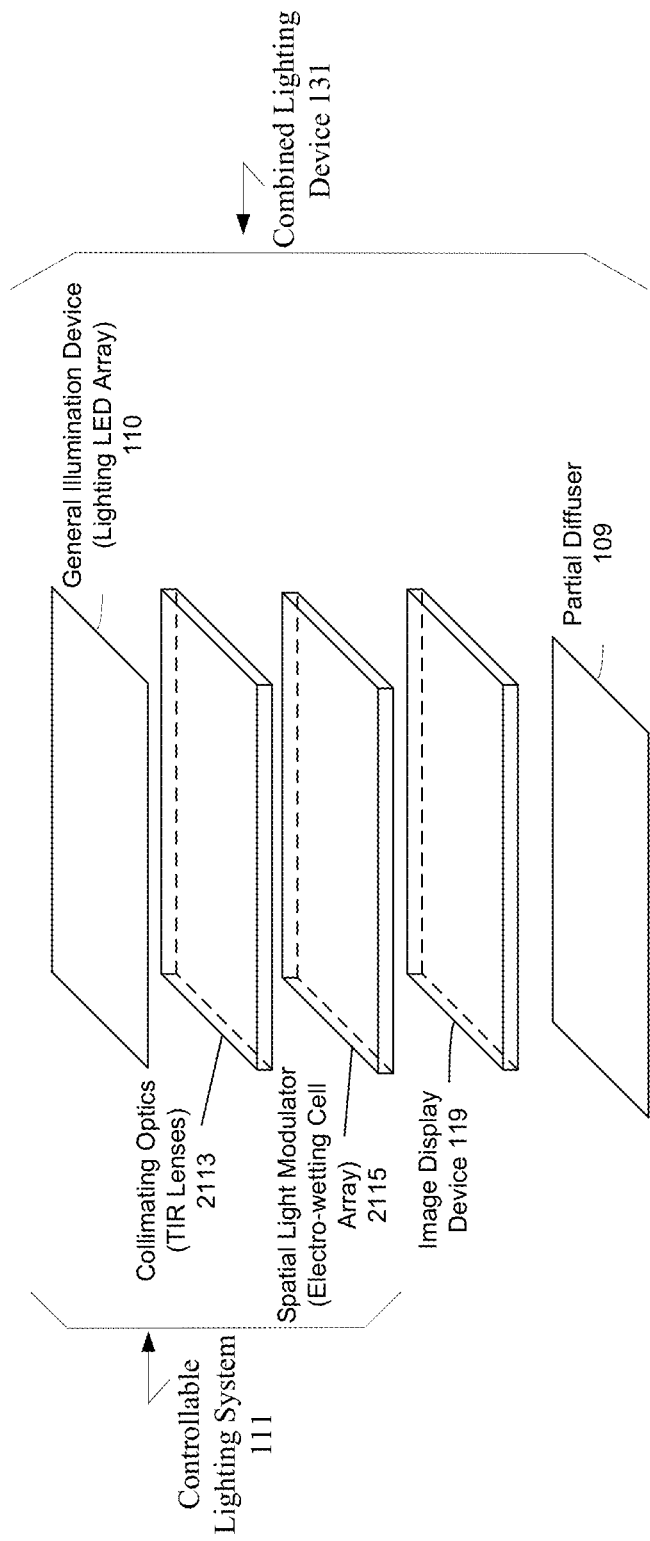
FIG. 1A is an illustration of components of an enhanced controllable lighting system, such as may be used in the software configurable lighting apparatus of FIG. 1.

In the example of FIG. 1A, combined lighting device 131 includes controllable lighting system 111 and image display device 119. The combined lighting device 131 optionally includes partial diffuser 109 placed so as to cover image display device 119 and partially diffuse light generated by both image display device 119 and controllable lighting system 111. In one example, partial diffuser 109 is a holographic type where the diffusion angle can be controlled to be a few degrees, such that the lighting distribution is not significantly affected by it, but at the same time can hide some features of the layers behind it that would otherwise be more visible since the display layer is partially transparent.

Controllable lighting system 111 includes general illumination device 110. In one example, general illumination device 110 includes an array of LEDs configured to emit light for general illumination within a space. In the example of FIG. 1A, the controllable lighting system 111 also optionally includes collimating optics 2113 and/or spatial light modulator 2115. Collimating optics 2113 is formed, for example, with a collection of total internal reflection (TIR) lenses. Collimating optics 2113 enable light emitted by general illumination display 110 to be coupled more efficiently to transparent regions of image display device 119 and/or spatial light modulator 2115. Spatial light modulator 2115 is, for example, an electro-wetting cell array. Spatial light modulator 2115 enables light emitted by general illumination device 110, and optionally collimated by collimating optics 2113, to be shaped and/or steered for general illumination within a space.

As noted with regard to FIG. 1A, the controllable lighting system 111 may also include a controllable spatial light modulator 2115 for processing the emitted light according to the modified general lighting generation selection. To explain in more detail by way of example, the controllable lighting system 111 may receive control signals from the driver system 113 that control beam steering/beam shaping by spatial light modulator 2115 to process light with a particular beam steering and/or beam shaping process to provide a desired spatial distribution of general illumination.

Figure 2:
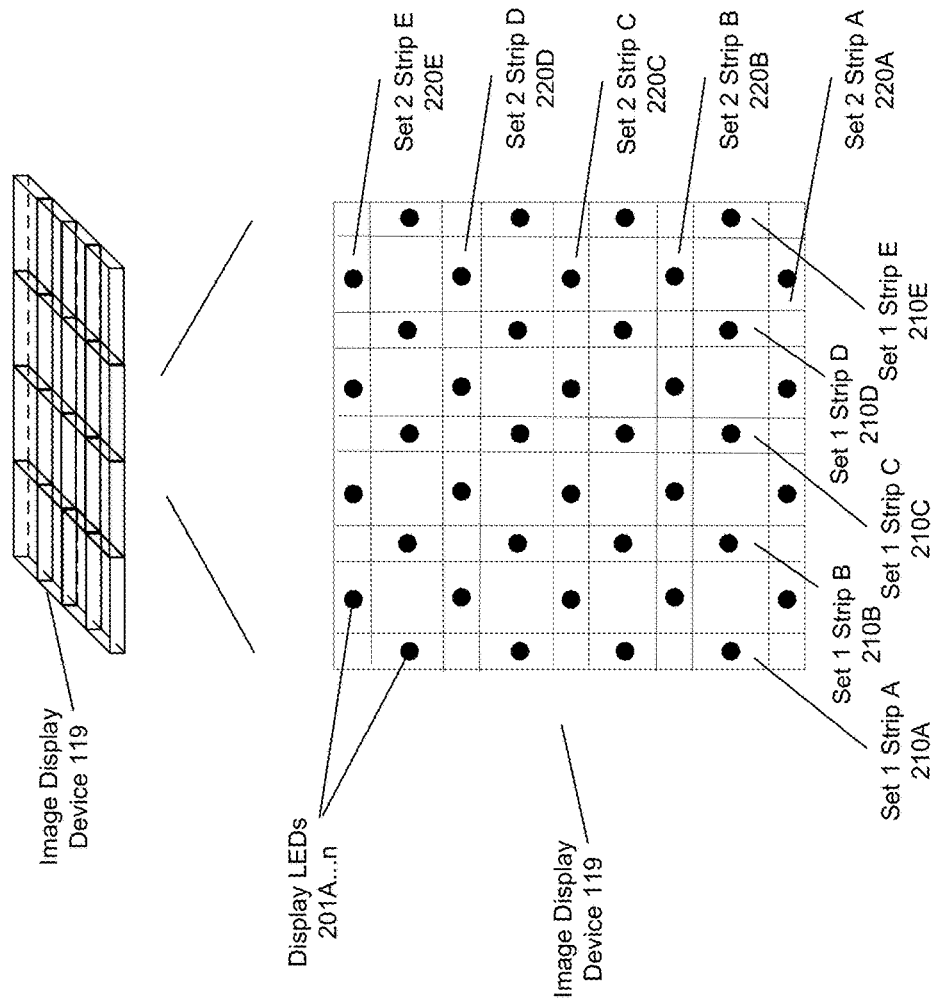
FIG. 2 is an isometric view of an image display device and an enlarged plan view of a portion of the image display device depicting a LED grid formed by strips of LEDs, such image display device being implemented in a software configurable lighting apparatus, like that of FIG. 1

FIG. 2 depicts an isometric view of image display device 119 and an enlarged plan view of a portion of image display device 119, formed as a grid of LEDs interspersed along two sets of strips with one set of strips placed perpendicular to the other set of strips. Referring to the enlarged plan view of FIG. 2, image display device 119 includes two sets of LED strips. For example, the first set includes set 1 strip A-set 1 strip E 210A-210E and the second set includes set 2 strip A-set 2 strip E 220A-220E. Each strip of the first set is positioned in parallel with and evenly spaced apart from neighboring strips of the first set. For example, set 1 strip B 210B is placed in parallel with and evenly spaced apart from set 1 strip A 210A and set 1 strip C 210C. As a further example, set 1 strip B 210B is placed 14 mm apart from set 1 strip A 210A and 14 mm apart from set 1 strip C 210C. Similarly, each strip of the second set is positioned in parallel with and evenly spaced apart from neighboring strips of the second set. For example, set 2 strip B 220B is placed in parallel with and evenly spaced apart from set 2 strip A 220A and set 2 strip C 220C. As a further example, set 2 strip B 220B is placed 14 mm apart from set 2 strip A 220A and 14 mm apart from set 2 strip C 220C. In addition, the first set of LED strips is placed perpendicular to the second set of LED strips. For example, set 1 strip A 210A is placed perpendicular to set 2 strip A 220A. In this way, the two sets of LED strips form a grid.

The grid formed by the two sets of LED strips includes display LEDs 201A . . . n. More specifically, each LED strip includes some number (e.g., four as depicted in FIG. 2) of LEDs 201A . . . n. Each LED in a strip is evenly spaced apart from neighboring LEDs in the same LED strip. For example, each LED in set 1 strip A 210A is placed 2 mm apart from each neighboring LED in the strip. In a further example, when LEDs within a strip are placed 2 mm apart and each strip within a set is placed 14 mm apart from neighboring strips within the set, each LED of one set are located 10 mm apart from neighboring LEDs of the other set at a 45° angle with respect to the perpendicular strips. With this approach, the number of LEDs in any one strip is minimized and the spacing between LEDs is maximized while also maintaining an acceptable level of transparency and an acceptable resolution for image display.

In a further example, each LED is controlled individually and the minimized number of LEDs per strip allows the use of fewer drivers per strip. The minimized number of LEDs, in this further example, also allows the drivers to be placed at the edge of each strip. In this further example, a single 48 channel driver can be used to control 16 RGB LEDs in one strip. The resulting grid of this further example provides roughly 10 mm resolution along a 45° angle for a display of size ~14 mm*(16+1)=240 mm square, where all the LED drivers are along the edge and do not reduce the transparency of the LED display. In an alternate example, the LEDs are arranged in a rectangular grid at the intersecting points between the grid lines, with transparent sections in regions without LEDs or address lines. In this alternate example, alternative approaches to driving the LEDs, such as a passive matrix approach, can also minimize the number of address lines/drivers and improve the transparency of the LED display.

As shown in the cross-sectional view of FIG. 1A, each of the controllable lighting systems 111 is formed by a general illumination display 110 optionally in combination with collimating optics 2113 and/or a spatial light modulator 2115. Each combination of a general illumination display 110, collimating optics 2113 and a spatial light modulator 215 operates and is controlled essentially as described by way of example above, to produce a distributed light output suitable for general illumination.

In the example of FIGS. 1 and 1A, the image light and/or general illumination light from the image display device 119 provides an image visible to a person within the space in which the lighting device 11 is installed. The intensity and/or color characteristics of the image and/or light output of the image display device 119 may be selectively controlled, however, there is no direct spatial modulation of image light. Light, however, is additive. The light output of controllable lighting system 111 is selectively modulated. Hence, in an example like that shown in FIGS. 1 and 1A, the combination of light from the image display and light from the controllable lighting system 111 can be controlled to emulate a lighting distribution of a selected one of a variety of different luminaires. More specifically, as described in greater detail below, an image to be displayed is transformed based on a desired color characteristic distribution while general lighting generation control data is modified based on the transformed image such that the combination of the display of the transformed image and general illumination produced by the modified control data provides a desired result.

In the examples we have been considering so far, a processor, such as 123 configures the lighting device 11 to provide light output from the image display device 119 and to operate the controllable lighting system 111 to provide general illumination that substantially emulates a lighting distribution of a selected one of a number of types of luminaire, based on the lighting device configuration information.

As described herein, a software configurable lighting device 11 (e.g. FIG. 1) of the type described herein can store configuration information for one or more luminaire output distributions. A user may define the parameters of a distribution in the lighting device 11, for example, via a user interface on a controller or user terminal (e.g. mobile device or computer) in communication with the software configurable the lighting device 11. In another example, the user may select or design a distribution via interaction with a server, e.g. of a virtual luminaire store; and the server communicates with the software configurable lighting device 11 to download the configuration information for the selected/designed distribution into the lighting device 11. When the software configurable lighting device 11 stores configuration information for a number of lighting distributions, the user operates an appropriate interface to select amongst the distributions available in the software configurable lighting device 11. Selections can be done individually by the user from time to time or in an automatic manner selected/controlled by the user, e.g. on a user's desired schedule or in response to user selected conditions such as amount of ambient light and/or number of occupants in an illuminated space.

Figure 3:
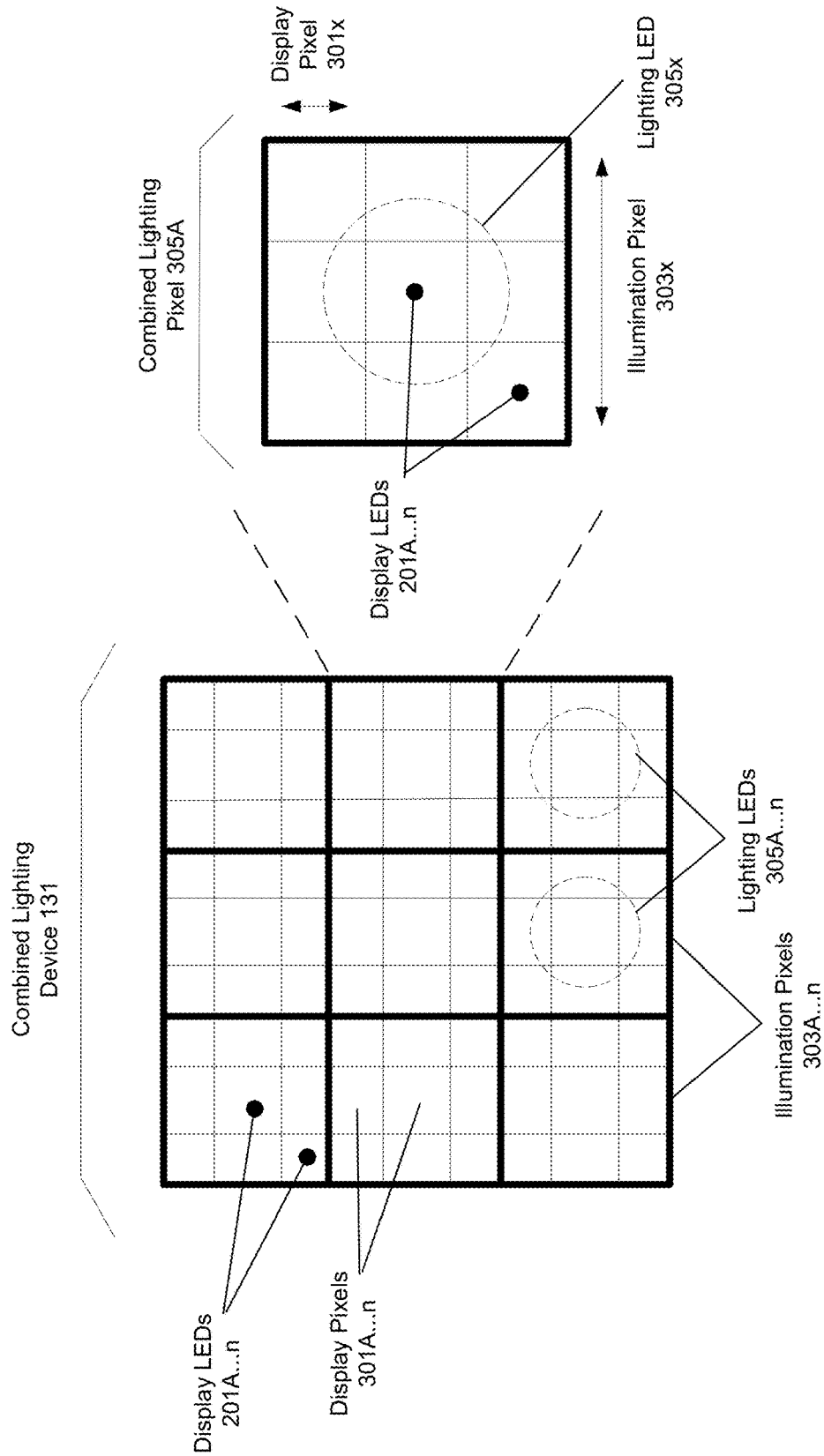
FIG. 3 is a stylized view of a software configurable lighting apparatus depicting a relationship between an image display device and a general illumination device as well as a relationship between a display pixel of the image display device and an illumination pixel of the general illumination device.

FIG. 3 illustrates, at a high level, the relationship between LEDs forming image display device 111 and the LED array of general illumination device 110. As discussed above, image display device 111 includes display LEDs 201A . . . n arranged in a grid. Likewise, general illumination device 110 includes lighting LEDs 305A . . . n arranged as an array of LEDs. However, each lighting LED 305x typically generates light covering an area, herein referred to as an illumination pixel, that encompasses multiple areas, herein referred to as display pixels, corresponding to some number of display LEDs 201A . . . n. For example, each lighting LED 305x (depicted in FIG. 3 by a dashed circle) and corresponding illumination pixel 303x (depicted in FIG. 3 by a darker solid line) encompasses nine display LEDs 201A . . . n (depicted in FIG. 3 by a dark filled circle) and corresponding display pixels 201A . . . n (depicted in FIG. 3 by lighter solid lines). Although FIG. 3 depicts a combined lighting pixel 305A as a single illumination pixel 303x encompassing nine display pixels 301x, this is only for simplicity and each illumination pixel may encompass fewer or more display pixels 301A . . . n.

Figure 4:
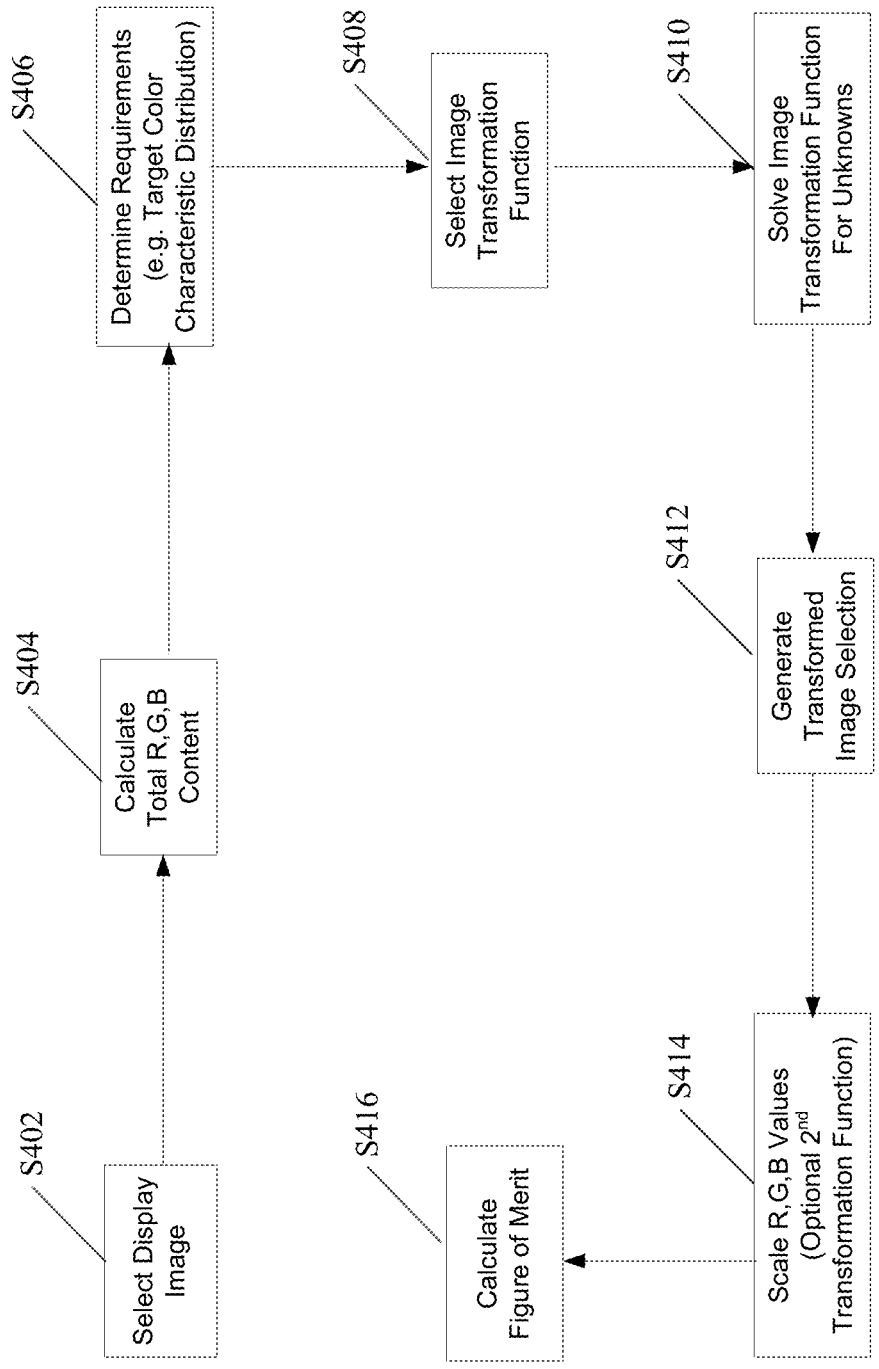
FIG. 4 is an example of a high-level process flow involved in a transformation of an image display selection.

Of particular note, each lighting pixel 305A includes a contribution of light corresponding to illumination pixel 303x and a contribution of light corresponding to some number of display pixels 301A . . . n. However, due to the additive nature of light, the contribution of each display pixel 301x, without transformation, and the contribution of each illumination pixel 303x, without modification, may produce an undesirable result. More specifically, light generated by controllable lighting system 111 and intended for general illumination, without modification, may tend to "wash out" any image displayed by image display device 119. Likewise, light generated by image display device 119, without transformation, may tend to change a color characteristics distribution of the general illumination generated by controllable lighting system 111 (e.g., an intended "white" light may not appear "white"). As such, an approach is needed to compensate for each contribution made within the combined lighting device 131. FIG. 4 is a flow chart depicting an example of a process for transforming an image selection and FIG. 5 is a flow chart depicting an example of a process for modifying a general illumination generation selection.

Figure 5:
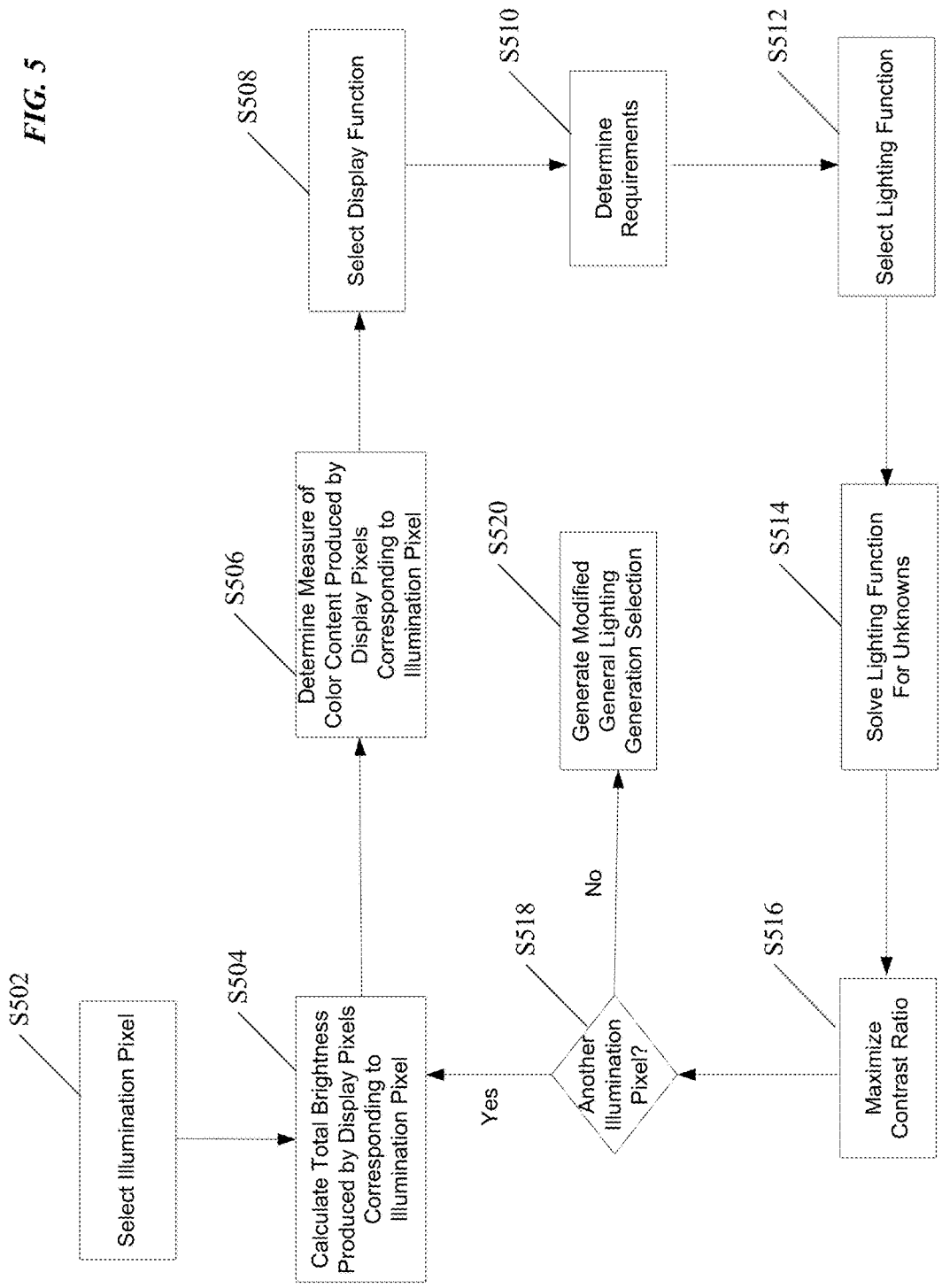
FIG. 5 is an example of a high-level process flow involved in a modification of a general illumination generation selection.

Before discussing the specific examples of FIGS. 4-5, it may be helpful to review typical structures for image data and control data. In general, an image may be viewed as a collection of image pixels, where each image pixel projects a particular color. The color to be projected by a particular image pixel is often defined as a combination of primary colors, most often red (R), green (G) and blue (B); although other combinations exists, such as cyan (C), magenta (M), yellow (Y) and black (K). Thus, one image pixel may be defined by an RGB value representing an amount of R, an amount of G and an amount of B to be combined. Similarly, an array of emitters to generate general illumination may also be viewed as a collection of illumination pixels, where each illumination pixel projects a particular chromaticity with a specified intensity. Although chromaticity may be perceived as a particular color, chromaticity is often defined as a coordinate on an x,y color coordinate system. Hence, an illumination pixel may be defined by an xyY value representing chromaticity (i.e., xy) and intensity (i.e., Y). Alternatively or in addition, given "white" or other "single color" emitters, intensity data may be sufficient to drive general illumination generation in a software configurable luminaire.

The process of FIG. 4 begins in step S402 where a display image is selected. In step S404, a total red, green, blue (R,G,B) content of the image selection is calculated. Red, green and blue are commonly referred to as the primary colors and, as is well known, these three colors may be combined in any number of ways to create any visible color. Thus, any given display pixel within an image can be defined as a combination of some amount of red, some amount of green and some amount of blue. In one approach, each amount ranges between 0 and 1. Furthermore, an image selection is defined by a collection of display pixels arranged in rows and columns, with $C_D$ representing a total number of display columns and $R_D$ representing a total number of display rows. Hence, image selection contains i columns and j rows, where $1 \leq i \leq C_D$ and $1 \leq j \leq R_D$. In one example, $R_T(i,j)$ represents the amount of red, $G_T(i,j)$ represents the amount of green and $B_T(i,j)$ represents the amount of blue within the display pixel of the $i^{th}$ column and $j^{th}$ row of the image selection. Additionally, $0 \leq R_T(i,j) \leq 1$, $0 \leq G_T(i,j) \leq 1$, and $0 \leq B_T(i,j) \leq 1$ in this example. As such, the total R,G,B content may be calculated as $$T = \sum_{i=1}^{C_D}\sum_{j=1}^{R_D} R_T(i,j) + \sum_{i=1}^{C_D}\sum_{j=1}^{R_D} G_T(i,j) + \sum_{i=1}^{C_D}\sum_{j=1}^{R_D} B_T(i,j) \quad \text{(equation 1)}.$$

In step S406, display requirements of the output of the image display device are determined. For example, one display requirement is that the "total" color contribution of the displayed output matches a target coordinated color temperature (CCT). Although a single display requirement is utilized in the following examples, this is only for simplicity and any number of display requirements may be determined. Additional display requirements include, for example, distance to a target surface and maximum color variation within MacAdams ellipses.

Given determined display requirements from step S406, an image transformation function is selected in step S408. For example, given a single display requirement that total color contribution of the displayed output matches a target CCT, a linear transformation function may be selected. In this example, the linear transformation function is $$R_1(i,j) = \alpha R_T(i,j) + \beta \quad \text{(equation 2)}$$

$$G_1(i,j) = \gamma G_T(i,j) + \delta \quad \text{(equation 3)}$$

$$B_1(i,j) = \varepsilon B_T(i,j) + \zeta \quad \text{(equation 4)}$$

where $R_1$, $G_1$, $B_1$ correspond to transformed image pixels and the sub-script 1 indicates a first transformation. Of note, subsequent steps may include one or more additional transformations, in which case sub-script 2 indicates a second transformation, sub-script 3 indicates a third transformation, etc. Of further note, while the selected transformation function based on a single display requirement only has 2 unknowns for each color (i.e. $\alpha, \beta$ for Red; $\gamma, \delta$ for Green; $\varepsilon, \zeta$ for Blue), transformation functions selected based on multiple display requirements will have additional unknowns.

Once an image transformation function is selected in step S408, the selected image transformation function is solved for the unknowns in step S410. Given, for example, the single display requirement and 6 unknowns described above related to a linear transformation function, 6 constraints are needed to solve the linear transformation function for the 6 unknowns. In this example, to achieve a target CCT of the displayed output, the total R, G, B content of the transformed image should be in certain ratios $f_R$, $f_G$, $f_B$. Said another way, the target CCT of the displayed output can be determined as some portion of Red (i.e. the ratio $f_R$), some portion of Green (i.e. the ratio $f_G$), and some portion of Blue (i.e. the ratio $f_B$), that when combined, produces the target CCT. These 3 ratios $f_R$, $f_G$, $f_B$ provide 3 of the 6 constraints.

Based on the image display device, the ratios $f_R$, $f_G$, $f_B$ can be calculated in a number of different ways. In one example, peak wavelength, bandwidth and maximum brightness output for each of R, G, B within a display pixel are utilized as inputs to the calculation. More generally, emission spectra of each R, G, B display pixel as well as maximum brightness for each of the three colors are needed as calculation inputs. In the example related to a target CCT, an additional calculation constraint is imposed because achieving a target CCT requires achieving target color coordinates $(x_T, y_T)$ on the black body curve. In addition, a further constraint is included, for example, to achieve the highest color rendering index (CRI). As a result, there are 6 unknowns or degrees of freedom including $\alpha, \beta, \gamma, \delta, \varepsilon, \zeta$ (i.e. two scaling factors for each of the R, G, B display output) and $(x_T, y_T)$. Once calculated, these 3 ratios need to be modified to account for peak brightness of each LED. Alternatively, the fractions are calculated, for example, with a constraint that any change to the selected image should be minimal. Although various constraints have been discussed, these are only for simplicity and any number of constraints may be applied. Given the ratios $f_R$, $f_G$, $f_B$, 3 of the 6 constraints necessary to solve for the 6 unknowns of the selected image transformation function have been identified. However, 3 additional constraints are still needed.

In one example, the 3 additional constraints are represented by a requirement that minimum color values for each of R, G, B remain the same after the transformation as before the transformation. The intent of this additional requirement is to ensure non-negative color values. As one example for calculating the 3 ratios and 3 additional constraints, each display pixel may comprise red with peak wavelength of 632 nm, bandwidth of 20 nm, and maximum brightness of 55 mcd; green with peak wavelength of 525 nm, bandwidth of 30 nm, and maximum brightness of 170 mcd; blue with peak wavelength of 470 nm, bandwidth of 20 nm and maximum brightness of 28 mcd; and a target CCT of 3000K. Given $$\sum_{i=1}^{C_D}\sum_{j=1}^{R_D} R_1(i,j) = f_R T \quad \text{(equation 5)}$$

$$\sum_{i=1}^{C_D}\sum_{j=1}^{R_D} G_1(i,j) = f_G T \quad \text{(equation 6)}$$

$$\sum_{i=1}^{C_D}\sum_{j=1}^{R_D} B_1(i,j) = f_B T \quad \text{(equation 7)}$$

then the 3 ratios are $f_RT=0.6364$, $f_GT=0.3012$, $f_BT=0.0624$.

Solving for unknowns results in $$\alpha\Sigma_{i=1}^{CD}\Sigma_{j=1}^{RD}R(i,j)+\beta R_D C_D = f_R T \quad \text{(equation 8)}$$

$$\gamma\Sigma_{i=1}^{CD}\Sigma_{j=1}^{RD}G(i,j)+\delta R_D C_D = f_G T \quad \text{(equation 9)}$$

$$\varepsilon\Sigma_{i=1}^{CD}\Sigma_{j=1}^{RD}B(i,j)+\zeta R_D C_D = f_B T \quad \text{(equation 10)}$$

each of which can be simplified as $$\alpha R_{TT}+\beta R_D C_D = f_R T \quad \text{(equation 11)}$$

$$\gamma G_{TT}+\delta R_D C_D = f_G T \quad \text{(equation 12)}$$

$$\varepsilon B_{TT}+\zeta R_D C_D = f_B T \quad \text{(equation 13)}.$$

The 3 constraints of the minimum color value requirement may be reflected mathematically as follows:

$$\text{Min}(R_1(i,j)) = \text{Min}(R(i,j)) = > \alpha R_{min} + \beta = \quad \text{(equation 14)}$$
$$R_{min} => \beta = R_{min}(1-\alpha) \text{ and } \alpha = \frac{f_R T - R_{min} R_D C_D}{R_{TT} - R_{min} R_D C_D}$$

$$\text{Min}(G(i,j)) = \text{Min}(G(i,j)) = > \gamma G_{min} + \delta = \quad \text{(equation 15)}$$
$$G_{min} => \delta = G_{min}(1-\gamma) \text{ and } \gamma = \frac{f_G T - G_{min} R_D C_D}{G_{TT} - G_{min} R_D C_D}$$

$$\text{Min}(B_1(i,j)) = \text{Min}(B(i,j)) = > \varepsilon B_{min} + \zeta = \quad \text{(equation 16)}$$
$$B_{min} => \zeta = B_{min}(1-\varepsilon) \text{ and } \varepsilon = \frac{f_B T - B_{min} R_D C_D}{B_{TT} - B_{min} R_D C_D}$$

The first image transformation then becomes $$R_1(i,j) = \left(\frac{f_R T - R_{min} R_D C_D}{R_{TT} - R_{min} R_D C_D}\right)(R_T(i,j) - R_{min}) + R_{min} \quad \text{(equation 17)}$$

$$G_1(i,j) = \left(\frac{f_G T - G_{min} R_D C_D}{G_{TT} - G_{min} R_D C_D}\right)(G_T(i,j) - G_{min}) + G_{min} \quad \text{(equation 18)}$$

$$B_1(i,j) = \left(\frac{f_B T - B_{min} R_D C_D}{B_{TT} - B_{min} R_D C_D}\right)(B_T(i,j) - B_{min}) + B_{min}. \quad \text{(equation 19)}$$

The transformed image selection to be displayed is generated in step S412. Of particular note, the transformed image selection is generated, for example, by applying equations 17-19 to each pixel of the image selection. In step S414, transformed R, G, B values are scaled to ensure values do not exceed 1. If the first image transformation appropriately scales values, this step is optional. Once the transformed image selection is generated and scaled, a figure of merit is calculated in step S416 and stored. The figure of merit represents a measure of how different the image selection and the transformed image selection are. In various examples, particularly over a period of time and/or given differing display requirements, the process of FIG. 4 may be applied multiple times to the same image selection, resulting in multiple different transformed image selections. Based on the calculated figure of merit for each different transformed image selection, a transformed image selection that, for example, differs the least from the image selection may be selected.

While the process of FIG. 4 transforms an image selection to account for the additive nature of light, the process of FIG. 5 modifies a general illumination generation selection to account for the same additive nature based on the transformed image selection. However, unlike the process of FIG. 4 where transformation of the image as a whole occurs in a single step (e.g., step S412), the process of FIG. 5 is performed for each illumination pixel and repeated, as necessary, until all illumination pixels have been addressed. That is, the modified general illumination generation selection is a collection of modified control data appropriate to individually control each LED of the general illumination device 110.

In step S502, an illumination pixel is selected. The selected illumination pixel is located in the $k^{th}$ column and the $l^{th}$ row of an array of illumination pixels. As discussed above in relation to FIG. 3, each illumination pixel corresponds to some number of display pixels. As such, the selected illumination pixel also has a corresponding number of display pixels forming an M×N array with each corresponding display pixel being referenced by the term (i,j,k,l) with i representing the column position and j representing the row position. In step S504, total brightness to be produced by the corresponding number of display pixels is calculated. In one example, the total brightness to be produced is calculated as $$Y_{JPD}(k,l)=\Sigma_{i=1}^{M}\Sigma_{j=1}^{N}Y_D(i,j,k,l) \quad \text{(equation 20)}$$

where Y is a tristimulus value representing a measure of perceived brightness, $Y_D(i,j,k,l)$ is the brightness of the corresponding display pixel, and $Y_{JPD}(k,l)$ is the total brightness to be produced by the corresponding display pixels within the illumination pixel. As can be seen, step S504 determines the amount of brightness to be displayed by a number of display pixels based on a transformed image selection.

In step S506, a measure of color content to be produced by the corresponding number of display pixels is determined. In one example, the measure of color content is calculated as $$d_{JPD}(k,l)=\Sigma_{i=1}^{M}\Sigma_{j=1}^{N}\sqrt{(y_D(i,j,k,l)-y_T)^2+(x_D(i,j,k,l)-x_T)^2} \quad \text{(equation 21)}$$

where d measures how far away the color content to be produced by the corresponding display pixels is from a target color coordinate. If the difference is small, for example, backlight within the illumination pixel is increased. Otherwise, if the difference is not small, for example, backlight within the illumination pixel is decreased.

At this point in the process, a measure of perceived brightness Y is calculated and a measure of color content d is calculated. In step S508, a display function is determined. In one example, the display function defines the relationship between the measure of perceived brightness Y and the measure of color content d. For example, the display function may be determined to be $$g(Y_{JPD}(k,l), d_{JPD}(k,l)) = \frac{Y_{JPD}^4(k,l)}{d_{JPD}(k,l)} \quad \text{(equation 22)}$$

where the fractional value f of g scaled over the entire illumination pixel is $$f = f_{JPD}(k,l) = \frac{g_{JPD}(k,l)}{\sum_{k=1}^{K}\sum_{l=1}^{L} g_{JPD}(k,l)}. \quad \text{(equation 23)}$$

In this example, g is higher when Y is high and d is low (i.e., illumination pixel will be brighter when corresponding display pixels are closer to the target color coordinate and whiter).

In step S510, illumination requirements are determined. Illumination requirements include, for example, a minimum amount of lighting output, a maximum amount of lighting output and a total light output matching a target amount of light output. Although other illumination requirements may be defined, the following example is based on these three illumination requirements.

Based on the determined illumination requirements, a lighting function is selected in step S512. For example, given the three illumination requirements listed above, a quadratic equation including three unknowns may be selected. Based on this example, the selected lighting function is $$L_L(f) = \alpha f^2 + \beta f + \gamma \qquad \text{(equation 24)}.$$

Once a lighting function is selected in step S512, the selected lighting function is solved for the unknowns based on the illumination requirements in step S514. In this example, the first illumination requirement is depicted as $L_L(f_{min}) = L_{min}$, the second illumination requirement is depicted as $L_L(f_{max}) = L_{max}$, and the third illumination requirement is depicted as $\Sigma_f L_L(f) = L_{LT}(\theta, \varphi)$ where $L_{LT}(\theta, \varphi)$ is the target lumen output. Then, each unknown is solved as follows:

$$\alpha = \frac{\begin{vmatrix} L_{max} & f_{max} & 1 \\ L_{min} & f_{min} & 1 \\ \frac{L_{LT}(\theta,\varphi)}{R} & \frac{1}{R} & 1 \end{vmatrix}}{\begin{vmatrix} f_{max}^2 & f_{max} & 1 \\ f_{min}^2 & f_{min} & 1 \\ \frac{\Sigma_f f^2}{R} & \frac{1}{R} & 1 \end{vmatrix}} \qquad \text{(equation 25)}$$

$$\beta = \frac{\begin{vmatrix} f_{max}^2 & L_{max} & 1 \\ f_{min}^2 & L_{min} & 1 \\ \frac{\Sigma_f f^2}{R} & \frac{L_{LT}(\theta,\varphi)}{R} & 1 \end{vmatrix}}{\begin{vmatrix} f_{max}^2 & f_{max} & 1 \\ f_{min}^2 & f_{min} & 1 \\ \frac{\Sigma_f f^2}{R} & \frac{1}{R} & 1 \end{vmatrix}} \qquad \text{(equation 26)}$$

$$\gamma = \frac{\begin{vmatrix} f_{max}^2 & f_{max} & L_{max} \\ f_{min}^2 & f_{min} & L_{min} \\ \frac{\Sigma_f f^2}{R} & \frac{1}{R} & \frac{L_{LT}(\theta,\varphi)}{R} \end{vmatrix}}{\begin{vmatrix} f_{max}^2 & f_{max} & 1 \\ f_{min}^2 & f_{min} & 1 \\ \frac{\Sigma_f f^2}{R} & \frac{1}{R} & 1 \end{vmatrix}}. \qquad \text{(equation 27)}$$

In step S516, a ratio of a numerator equal to the total amount of brightness to be produced by the display pixels corresponding to the selected illumination pixel to a denominator equal to the amount of brightness to be produced by the selected illumination pixel is maximized. For example, maximizing $$JCR(k, l) = \frac{fY_{JPD}(k, l) L_{DT}(\theta, \varphi)}{L_L(k, l)} \qquad \text{(equation 28)}$$

results in a contrast ratio that defines a modification of the illumination to be generated by the illumination pixel based on the amount of light to be produced by the corresponding display pixels. In one example, the overall display brightness is a fraction of the overall illumination output resulting in three benefits. First, a reasonable overall system efficiency based on an assumption that display efficiency is lower than illumination efficiency. Second, high net Color Rendering Index (CRI) within each illumination pixel where illumination and display lighting overlap due to lower display brightness compared to illumination brightness. Third, limited impact on lighting distribution by display output. In contrast, given equal intensity of all illumination pixels, a displayed image would appear "washed out". By modifying illumination produced by each illumination pixel, viewing angles of the displayed image are improved. Note that the above quantity is angle dependent due to the different display and illumination distributions. In one example, the display viewing angle is a function of the illumination distribution.

In step S518, a determination as to whether the selected illumination pixel is the last illumination pixel is made. If the selected illumination pixel is not the last illumination pixel, the process returns to step S504 and is performed for the next selected illumination pixel. Otherwise, the process proceeds to step S520 where a modified general lighting generation selection is generated and the process ends.

As can be seen by the processes of FIGS. 4 and 5, due to the additive nature of light, an image selection is transformed and a general lighting generation selection is modified such that the output produced by the image display device reflects a desired image and the illumination generated by the controllable lighting system reflects a desired general illumination for a space.

Figure 6:
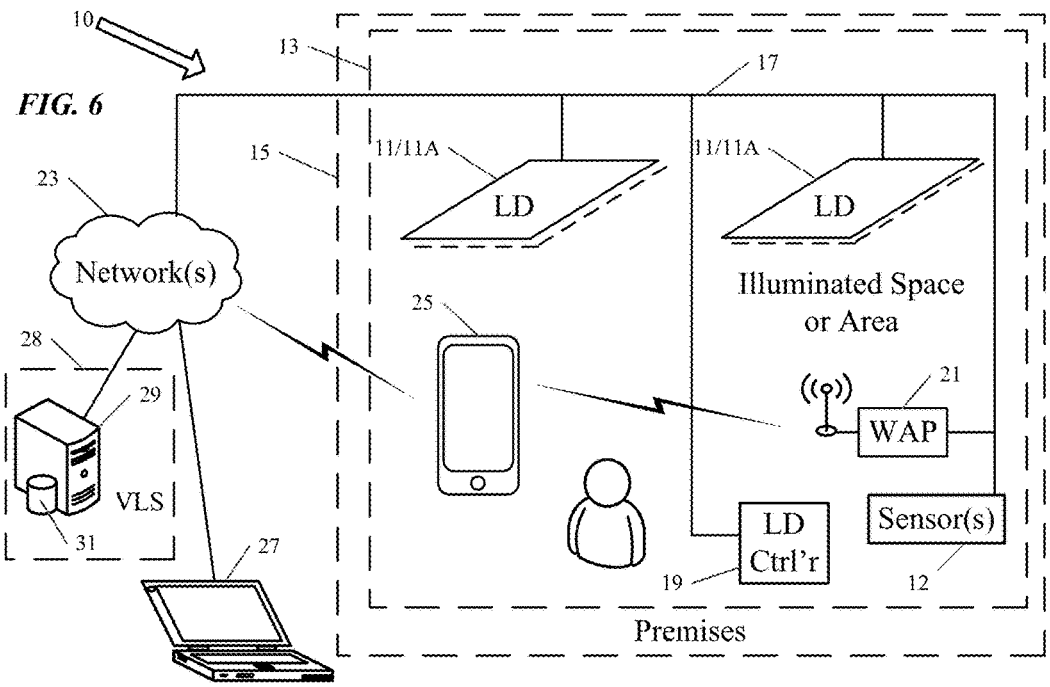
FIG. 6 is a high-level functional block diagram of a system including a software configurable lighting device that displays a transformed image display selection and provides general illumination based on a modified general illumination generation selection.
Figure 7:
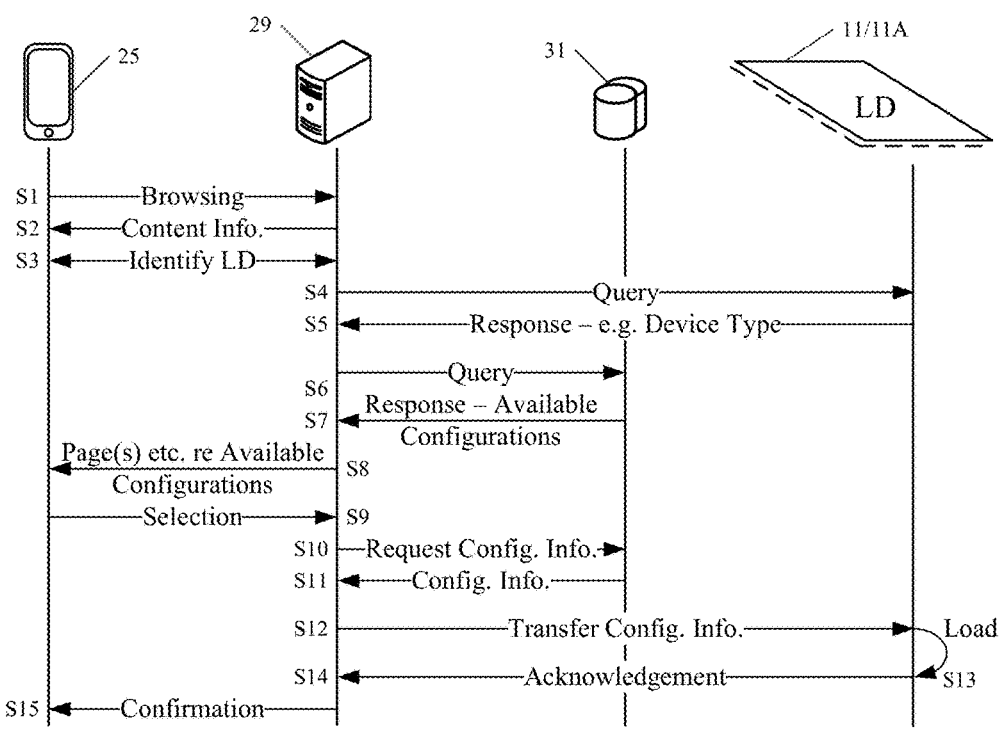
FIG. 7 is a ping-pong chart type signal flow diagram, of an example of a procedure for loading an image selection and/or a general illumination generation selection to a software configurable lighting device, in a system like that of FIG. 6.

To provide examples of these methodologies and functionalities and associated software aspects of the technology, it may be helpful to consider a high-level example of a system including software configurable lighting devices 11 (FIG. 6), and later, an example of a possible process flow for obtaining and installing configuration information (FIG. 7).

FIG. 6 illustrates a system 10 for providing configuration or setting information, e.g. based on a user selection, to a software configurable lighting device (LD) 11 of any of the types discussed herein. For purposes of discussion of FIG. 6, we will assume that software configurable lighting device 11 generally corresponds in structure to the block diagram illustration of a device 11 in FIG. 1.

In FIG. 6, the software configurable lighting device 11, as well as some other elements of system 10, are installed within a space or area 13 to be illuminated at a premises 15. The premises 15 may be any location or locations serviced for lighting and other purposes by such system of the type described herein. Lighting devices, such as lighting devices 11, that are install to provide general illumination lighting in the premises 15 typically comply with governmental building codes (of the respective location of the premises 15) and/or lighting industry standards. Most of the examples discussed below focus on indoor building installations, for convenience, although the system may be readily adapted to outdoor lighting. Hence, the example of system 10 provides configurable lighting and possibly other services in a number of service areas in or associated with a building, such as various rooms, hallways, corridors or storage areas of a building and an outdoor area associated with a building. Any building forming or at the premises 15, for example, may be an individual or multi-resident dwelling or may provide space for one or more enterprises and/or any combination of residential and enterprise facilities. A premises 15 may include any number of such buildings, and in a multi-building scenario the premises may include outdoor spaces and lighting in areas between and around the buildings, e.g. in a campus (academic or business) configuration.

The system elements, in a system like system 10 of FIG. 6, may include any number of software configurable lighting devices 11 as well as one or more lighting controllers 19. Lighting controller 19 may be configured to provide control of lighting related operations (e.g., ON/OFF, intensity, brightness) of any one or more of the lighting devices 11. Alternatively, or in addition, lighting controller 19 may be configured to provide control of the software configurable aspects of lighting device 11, as described in greater detail below. That is, lighting controller 19 may take the form of a switch, a dimmer, or a smart control panel including a user interface depending on the functions to be controlled through device 19. The lighting system elements may also include one or more sensors 12 used to control lighting functions, such as occupancy sensors or ambient light sensors. Other examples of sensors 12 include light or temperature feedback sensors that detect conditions of or produced by one or more of the lighting devices. If provided, the sensors may be implemented in intelligent standalone system elements such as shown at 12 in the drawing, or the sensors may be incorporated in one of the other system elements, such as one or more of the lighting devices 11 and/or the lighting controller 19.

The on-premises system elements 11, 12, 19, in a system like system 10 of FIG. 6, are coupled to and communicate via a data network 17 at the premises 15. The data network 17 in the example also includes a wireless access point (WAP) 21 to support communications of wireless equipment at the premises. For example, the WAP 21 and network 17 may enable a user terminal for a user to control operations of any lighting device 11 at the premises 13. Such a user terminal is depicted in FIG. 6, for example, as a mobile device 25 within premises 15, although any appropriate user terminal may be utilized. However, the ability to control operations of a lighting device 11 may not be limited to a user terminal accessing data network 17 via WAP 21 or other on-premises access to the network 17. Alternatively, or in addition, a user terminal such as laptop 27 located outside premises 15, for example, may provide the ability to control operations of one or more lighting devices 11 via one or more other networks 23 and the on-premises network 17. Network(s) 23 includes, for example, a local area network (LAN), a metropolitan area network (MAN), a wide area network (WAN) or some other private or public network, such as the Internet. In another example, a memory device, such as a secure digital (SD) card or flash drive, containing configuration data may be connected to one or more of the on-premises system elements 11, 12 or 19 in a system like system 10 of FIG. 6.

For lighting operations, the system elements for a given service area (11, 12 and/or 19) are coupled together for network communication with each other through data communication media to form a portion of a physical data communication network. Similar elements in other service areas of the premises are coupled together for network communication with each other through data communication media to form one or more other portions of the physical data communication network at the premises 15. The various portions of the network in the service areas in turn are coupled together to form a data communication network at the premises, for example to form a LAN or the like, as generally represented by network 17 in FIG. 6. Such data communication media may be wired and/or wireless, e.g. cable or fiber Ethernet, Wi-Fi, Bluetooth, or cellular short range mesh. In many installations, there may be one overall data communication network 17 at the premises. However, for larger premises and/or premises that may actually encompass somewhat separate physical locations, the premises-wide network 17 may actually be built of somewhat separate but interconnected physical networks utilizing similar or different data communication media.

System 10 also includes server 29 and database 31 accessible to a processor of server 29. Although FIG. 6 depicts server 29 as located outside premises 15 and accessible via network(s) 23, this is only for simplicity and no such requirement exists. Alternatively, server 29 may be located within premises 15 and accessible via network 17. In still another alternative example, server 29 may be located within any one or more system element(s), such as lighting device 11, lighting controller 19 or sensor 12. Similarly, although FIG. 6 depicts database 31 as physically proximate server 29, this is only for simplicity and no such requirement exists. Instead, database 31 may be located physically disparate or otherwise separated from server 29 and logically accessible by server 29, for example via network 17.

Database 31 is a collection of configuration information files for use in conjunction with one or more of software configurable lighting devices 11 in premises 15 and/or similar devices 11 of the same or other users at other premises. For example, each configuration information file within database 31 includes lighting device configuration information to operate the modulator of a lighting device 11 to steer and/or shape the light output from the light source to distribute the light output from the lighting device 11 to emulate a lighting distribution of a selected one of a number of types of luminaire. In many of the examples of the software configurable lighting device 11, the controllable optical modulator is configured to selectively steer and/or selectively shape the light output from the source responsive to one or more control signals from the programmable controller. The distribution configuration in a configuration information file therefore will provide appropriate setting data for each controllable parameter, e.g. selective beam steering and/or selective shape.

For some examples of the software configurable lighting device 11, the controllable optical modulator is essentially a single unit coupled/configured to modulate the light output from the emission aperture of the light source. In such an example, the distribution configuration in a configuration information file provides setting(s) appropriate for the one optical spatial modulator. In other examples of the software configurable lighting device 11, the controllable optical modulator has sub units or pixels that are individually controllable at a pixel level for individually/independently modulating different portions of the light emission from the overall output aperture of the light source. In such an example, the distribution configuration in a configuration information file provides setting(s) appropriate for each pixel of the pixel-level controllable spatial modulator.

The light source of a software configurable lighting device 11 could be a display type element, in which case a configuration information file could provide an image for output via the display. In examples for a general illumination light source, the configuration information file need not include any image-related information. In many cases, however, the configuration information file may include values for source performance parameter settings, e.g. for maximum or minimum intensity, dimming characteristics, and/or color characteristics such as color temperature, color rendering index, R9 value, etc. In other cases, it is envisioned that the configuration file includes algorithms that determine source performance parameter settings including image generation settings. The algorithms may be Fourier-based or chaotic function-based for generating the image data. The general illumination may be based on algorithms for the luminaire manufacturer specifications or requirements.

The software configurable lighting device 11 is configured to set modulation parameters for the spatial modulator and possibly set light generation parameters of the light source in accordance with a selected configuration information file. That is, a selected configuration information file from the database 31 enables software configurable a lighting device 11 to achieve a performance corresponding to a selected type of luminaire for a general illumination application of the particular type of luminaire. Thus, the combination of server 29 and database 31 represents a "virtual luminaire store" (VLS) 28 or a repository of available configurations that enable a software configurable lighting device 11 to selectively function like any one of a number of luminaires represented by the available configurations.

It should be noted that the output performance parameters need not always or precisely correspond optically to the emulated luminaire. For a catalog luminaire selection example, the light output parameters may represent those of one physical luminaire selected for its light characteristics whereas the distribution performance parameters may be those of a different physical luminaire or even an independently determined performance intended to achieve a desired illumination effect in area 13. The light distribution performance, for example, may conform to or approximate that of a physical luminaire or may be an artificial construct for a luminaire not ever built or offered for sale in the real world.

It should also be noted that, while various examples describe loading a single configuration information file onto a software configurable lighting device 11, this is only for simplicity. Lighting device 11 may receive one, two or more configuration information files and each received file may be stored within lighting device 11. In such a situation, a software configurable lighting device 11 may, at various times, operate in accordance with configuration information in any selected one of multiple stored files, e.g. operate in accordance with first configuration information during daylight hours and in accordance with second configuration information during nighttime hours or in accordance with different file selections from a user operator at different times. Alternatively, a software configurable lighting device 11 may only store a single configuration information file. In this single file alternative situation, the software configurable lighting device 11 may still operate in accordance with various different configuration information, but only after receipt of a corresponding configuration information file which replaces any previously received file(s).

An example of an overall methodology will be described later with respect to FIG. 7. Different components in a system 10 like that of FIG. 6 will implement methods with or portions of the overall methodology, albeit from somewhat different perspectives. It may be helpful at this point to discuss, at a high level, how various elements of system 10 interact to allow a lighting designer or other user to select a particular image and performance parameters to be sent to software configurable lighting device 11.

In one example, the user utilizes mobile device 25 or laptop 27 to access virtual luminaire store 28 provided on/by server 29 and database 31. Although the examples reference mobile device 25/laptop 27, this is only for simplicity and such access may be via LD controller 19 or any other appropriate user terminal device. Virtual luminaire store 28 provides, for example, a list or other indication of physical or virtual luminaires that may be emulated either by software configurable lighting devices 11 generally and/or by a particular software configurable lighting device 11. Virtual luminaire store 28 also provides, for example, a list or other indication of potential performance parameters under which software configurable lighting devices generally and/or lighting device 11 particularly may operate. Alternatively, or in addition, virtual luminaire store 28 may allow the user to provide a customized modulation and/or light performance parameters as part of the browsing/selection process. As part of the browsing/selection process, the user, for example, may identify the particular software configurable lighting device 11 or otherwise indicate a particular type of software configurable lighting device for which a subsequent selection relates. In turn, virtual luminaire store 28, for example, may limit what is provided to the user device (e.g., the user is only presented with performance parameters for luminaire emulations supportable by to the particular software configurable lighting device 11). The user, as part of the browsing/selection process, selects desired performance parameters to be sent to a particular software configurable lighting device 11. Based on the user selection, server 29 transmits a configuration information file containing configuration information corresponding to the selected parameters to the particular software configurable lighting device 11.

It may also be helpful to discuss, at a high level, how a software configurable lighting device 11 interacts with other elements of system 10 to receive a file containing configuration information and how the software configurable lighting device 11 utilizes the received file to operate in accordance with performance parameters specified by the lighting device configuration information from the file. In a method example from the device-centric perspective, the software configurable lighting device 11 receives a configuration information file via network 17, such as the configuration information file transmitted by server 29 in the previous example. The received configuration information file includes, for example, data to set the light output parameters of software configurable lighting device 11 with respect to spatial modulation and possibly with respect to light intensity, light color characteristic and the like. Lighting device 11 stores the received configuration file, e.g. in a memory of lighting device 11. In this further example, the software configurable lighting device 11 sets light output parameters in accordance with the data included in the configuration information file. In this way, lighting device 11 stores the received file and can utilize configuration information contained in the file control the light output distribution performance of software configurable lighting device 11 and possibly light output characteristics of the device 11.

The lighting device configuration information in a configuration file may correspond to performance of an actual physical luminaire, e.g. so that the software configurable lighting device 11 presents an illumination output for a general lighting application having a distribution and possibly light characteristics (e.g. intensity and color characteristic) approximating those of a particular physical lighting device of one manufacturer. The on-line store implemented by server 29 and database 31 in the example of FIG. 6 therefore would present content showing and/or describing a virtual luminaire approximating the performance of the physical lighting device. In that regard, the store may operate much like the manufacturer's on-line catalog for regular lighting devices allowing the user to browse through a catalog of virtual luminaire performance characteristics, many of which represent corresponding physical devices. However, virtual luminaire store 28 may similarly offer content about and ultimately deliver information defining the visible performances of other virtual luminaires, e.g. physical lighting devices of different manufacturers, or of lighting devices not actually available as physical hardware products, or even performance capabilities that do not emulate otherwise conventional lighting devices.

Virtual luminaire store 28 allows a lighting designer or other user to select from any such available luminaire performance for a particular luminaire application of interest. Virtual luminaire store 28 may also offer interactive on-line tools to customize any available luminaire performance and/or interactive on-line tools to build an entirely new luminaire performance for implementation via a software configurable lighting device 11.

The preceding examples focused on selection of one set of lighting device configuration information, for the luminaire performance characteristics. Similar procedures via virtual luminaire store 28 will enable selection and installation of one or more additional sets of lighting device configuration information, e.g. for use at different times or for user selection at the premises (when the space is used in different ways).

FIG. 7 is a Ping-Pong chart type signal flow diagram, of an example of a procedure for loading lighting device configuration information to a software configurable lighting device 11, in a system like that of FIG. 6. In an initial step S1, a user browses virtual luminaire store 28. For example, a user utilizes mobile device 25 to access server 29 and reviews various luminaires or luminaire performances available in the virtual luminaire store, as represented by configuration information files. Although mobile device 25 is referenced for simplicity in some examples, such access may be achieved by the user via laptop 27, LD controller 19 or other user terminal device. If the device 11 has appropriate user input sensing capability, access to store 28 may alternatively use device 11. In step S2, virtual luminaire store 28 presents information about available virtual luminaires to the user. The content may be any suitable format of multimedia information about the virtual luminaires and the performance characteristics, e.g., text, image, video or audio. While steps S1 and S2 are depicted as individual steps in FIG. 7, no such requirement exists and this is only for simplicity. Alternatively, or in addition, steps S1 and S2 may involve an iterative process wherein the user browses a series of categories and/or sub-categories and virtual luminaire store 28 provides the content of each category and/or sub-category to the user. That is, steps S1 and S2 represent the ability of a user to review data about some number of virtual luminaires available in virtual luminaire store 28 for configuring a software configurable lighting device.

In step S3, the user identifies a particular software configurable lighting device 11 for which a selected configuration information file is to be provided. For example, if the space or area 13 to be illuminated is the user's office, the user identifies one of several lighting devices 11 located in the ceiling or on a wall of that office. In step S4, server 29 queries the particular lighting device 11 through the network(s) to determine a device type, and the particular lighting device 11 responds with the corresponding device type identification.

In one example, software configurable lighting devices 11 include 3 different types of lighting devices. Each different lighting device, for example, utilizes a different spatial distribution system 111, possibly a different type of light source 110, and a different associated driver system 113. In such an overall example, each of the 3 different types of lighting devices 11 may only be configured to provide performance for some number of available virtual luminaire performance characteristics (e.g., different virtual luminaire output distributions and possibly different virtual luminaire output light parameters, such as intensity and color characteristics). In a three-device-type example, assume device type 1 supports X sets of virtual luminaire performance characteristics, device type 2 supports Y sets of virtual luminaire performance characteristics and device type 2 supports Z sets of virtual luminaire performance characteristics. Thus, in this example, server 29 queries lighting device 11 in step S4 and lighting device 11, in step S5, responds with device type 1, for example.

In step S6, server 29 queries database 31 to identify available sets of virtual luminaire performance characteristics supported by the particular lighting device 11. Such query includes, for example, the device type of the particular lighting device 11. In step S7, the database responds with available sets of virtual luminaire performance characteristics supported by the particular lighting device 11. For example, if particular lighting device 11 is of device type 1, then database 31, in step S7, responds with device type 1 available sets of virtual luminaire performance characteristics. In step S8, server 29 provides corresponding information to the user about those available sets of virtual luminaire performance characteristics supported by particular lighting device 11.

Thus, steps S3-S8 allow a user to be presented with information about performance parameter sets for only those virtual luminaires supported by the particular software configurable lighting device 11 that the user is attempting to configure. However, these steps are not the only way for identifying only those sets of virtual luminaire performance characteristics supported by a particular lighting device. In an alternate example, the user may identify the device type as part of step S3 and server 29 may proceed directly to step S6 without performing steps S4-S5.

In still another example, the user may identify the particular software configurable lighting device 11, either with or without a device type, in an initial step (e.g., perform step S3 before step S1). In this way, steps S1 and S2 only include information about performance parameter sets for those available virtual luminaires supported by the identified lighting device 11; and step S8 need not be performed as a separate step. In other words, steps S1-S8 represent only one example of how information describing available virtual luminaires in virtual luminaire store 28 are presented to a user for subsequent selection.

The user, in step S9, utilizes mobile device 25 to select information about a performance parameter set for a desired virtual luminaire lighting application from among the available virtual luminaire performance characteristics previously presented. For example, if the user desires a luminaire performance from device 11 analogous to performance of a particular can light with downlighting, and the performance for the desired can downlight is supported by lighting device 11, the user selects the virtual luminaire performance characteristics for the desired can downlight in step S9.

While the descriptions of various examples most commonly refer to information about a single virtual luminaire or selection of information about a single virtual luminaire, this is only for simplicity. The virtual luminaire store described herein allows a user to separately select each of the image to be displayed by a software configurable lighting device and the set of performance parameters to control illumination produced by that software configurable lighting device 11. As such, although not explicitly depicted in FIG. 7 or described above in relation to steps S1-S9, the user, for example, may select some of the performance characteristics for a desired first virtual luminaire lighting application corresponding to one type of luminaire, e.g. intensity and light color characteristics and select other performance parameters corresponding to a different virtual luminaire, e.g. shape and/or steering for beam light output distribution, as part of step S9. Alternatively, or in addition, the virtual luminaire store 28 may also allow the user to define or otherwise customize the set of performance parameters to be delivered to the software configurable lighting device 11.

In step S10, server 29 requests the corresponding information about the selected set of performance parameters from database 31 in order to obtain a corresponding configuration information file. Database 31, in step S11, provides the requested information to server 29. As noted previously, a software configurable lighting device 11 may be one particular type of multiple different types of software configurable lighting devices usable in systems such as 10 and supported by the virtual luminaire store 28. The selected configuration information may be different for each different type of software configurable lighting device (e.g., a first type device 11 may support light output distribution of one format while a second type device 11 may not support the same light output distribution format, a first type device 11 may support a first set of illumination performance parameters (intensity and/or color characteristics) while a second type device 11 may support a second set of illumination performance parameters). In one example, database 31 maintains different configuration information corresponding to each different type of software configurable lighting device 11; and, as part of step S11, database 31 provides the appropriate corresponding configuration information. Alternatively, database 31 maintains common or otherwise standardized configuration information; and, after receiving the requested configuration information from database 31, server 29 may manipulate or otherwise process the received configuration information in order to obtain a configuration information file more specifically corresponding to the type of the particular lighting device 11 intended to currently receive the configuration information. In this way, server 29 obtains a file of suitable configuration information including information about the selected set of performance parameters.

Server 29, in step S12, transfers the configuration information file to the particular software configurable lighting device 11. For example, the server 29 utilizes network(s) 23 and/or network 17 to communicate the configuration information file directly to the software configurable lighting device 11. Alternatively, or in addition, the server 29 may deliver the configuration information file to a user terminal (e.g., mobile device 25 or laptop 27) and the user terminal may, in turn, deliver the file to the software configurable lighting device 11. In still another example, the server 29 transfers the configuration information file to LD controller 19 which, in turn, uploads or otherwise shares the configuration information file with the software configurable lighting device 11.

In step S13, the software configurable lighting device 11 receives the configuration information file and stores the received file in memory (e.g., storage/memory 125). Once lighting device 11 has successfully received and stored the selected configuration information file, the software configurable lighting device 11 provides an acknowledgement to server 29 in step S14. In turn, server 29 provides a confirmation of the transfer to the user via mobile device 25 in step S15. In this way, a user is able to select a desired virtual luminaire performance from a virtual luminaire store and have the corresponding configuration information file delivered to the identified lighting device 11.

While the discussion of FIG. 7 focused on delivering a single configuration information file to a single software configurable lighting device 11, this is only for simplicity. The resulting configuration information file may be delivered to one or more additional lighting devices 11 in order to implement the same configuration on the additional lighting devices. For example, a user may elect to have steps S13-S15 repeated some number of times for a corresponding number of additional software configurable lighting devices. Alternatively, or in addition, the various steps of FIG. 7 may be repeated such that different configuration information files are delivered to different software configurable lighting devices 11. As such, a single configuration information file may be delivered to some number of software configurable lighting devices while a different configuration information file is delivered to a different number of lighting devices and still another configuration information file is delivered to yet a further number of lighting devices. In this way, the virtual luminaire store 28 represents a repository of sets of virtual luminaire performance characteristics which may be selectively delivered to utilized by one or more software configurable lighting devices 11.

Other aspects of the virtual luminaire store not shown may include accounting, billing and payment collection. For example, virtual luminaire store 28 may maintain records related to the type and/or number of configuration information files transmitted to software configurable lighting devices 11 at different premises 15 and/or owned or operated by different customers. Such records may include a count and/or identifications of different lighting devices receiving configuration information files, a count of how many times the same lighting device receives the same or a different configuration information file, a count of times each set of virtual luminaire performance characteristics is selected, as well as various other counts or other information related to selection and delivery of configuration information files. In this way, virtual luminaire store 28 may provide an accounting of how the store is being utilized.

In a further example, a value is associated with each configuration information file or each component included within the file (e.g., a value associated with each set of spatial modulation or distribution type performance parameters and/or a value associated with each set of light output performance parameters). The associated value may be the same for all configuration information files (or for each included component), or the associated value may differ for each configuration information file (or for each included component). While such associated value may be monetary in nature, the associated value may alternatively represent non-monetary compensation. In this further example, virtual luminaire store 28 is able to bill for each transmitted configuration information file (or each included component); and the operator of the store can collect payment based on a billed amount. In conjunction with the accounting described above, such billing and payment collection may also vary based on historical information (e.g., volume discount, reduced value for subsequent transmission of the same configuration information file to a different lighting device, free subsequent transmission of the same configuration information file to the same lighting device, etc.). In this way, virtual luminaire store 28 may allow an individual or organization operating the store to capitalize on the resources contained within the store.

Figure 10:
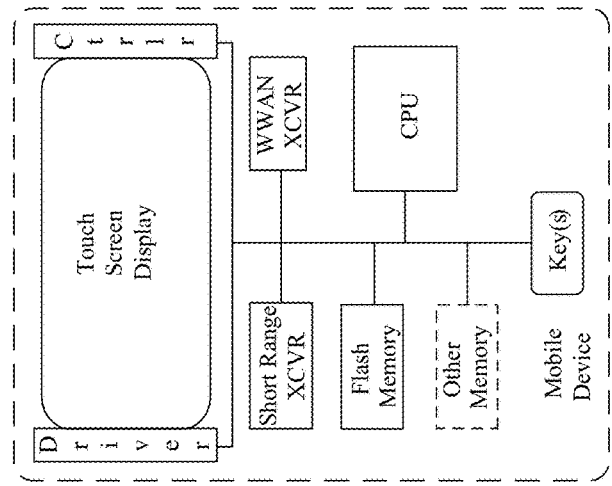
FIG. 10 is a simplified functional block diagram of a mobile device, as an alternate example of a user terminal device, for possible communication with a software configurable lighting apparatus.
Figure 9:
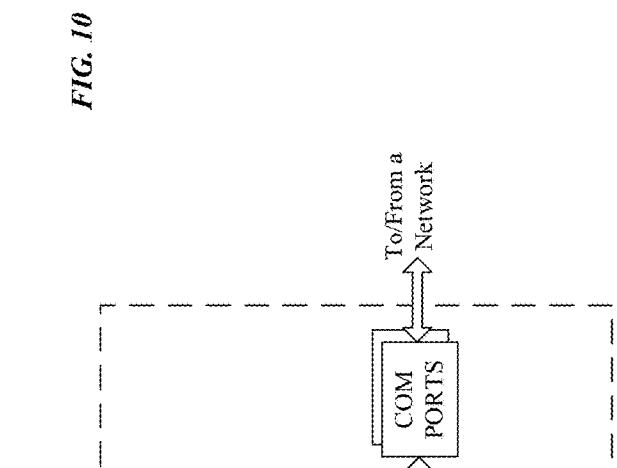
FIG. 9 is a simplified functional block diagram of a personal computer or other similar user terminal device, which may communicate with a software configurable lighting apparatus.
Figure 8:
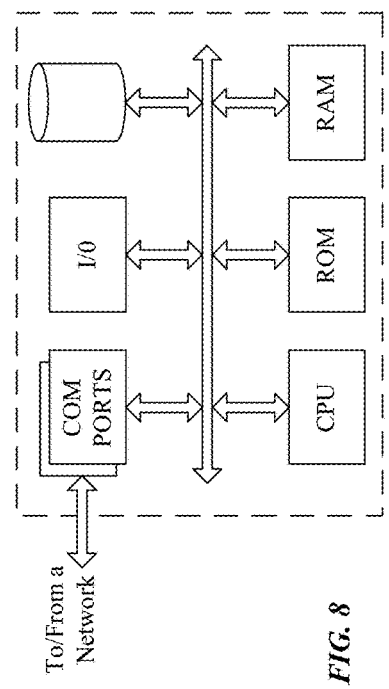
FIG. 8 is a simplified functional block diagram of a computer that may be configured as a host or server, for example, to supply image selection and/or general illumination generation selection to a software configurable lighting apparatus, such as that of FIG. 1, e.g., in a system like that of FIG. 6.

As shown by the above discussion, although many intelligent processing functions are implemented in lighting device, at least some functions may be implemented via communication with general purpose computers or other general purpose user terminal devices, although special purpose devices may be used. FIGS. 8-10 provide functional block diagram illustrations of exemplary general purpose hardware platforms.

FIG. 8 illustrates a network or host computer platform, as may typically be used to generate and/or receive lighting device 11 control commands and access networks and devices external to the lighting device 11, such as host processor system 115 of FIG. 1 or implement light generation and control functionality of driver system 113. FIG. 9 depicts a computer with user interface communication elements, such as 117 as shown in FIG. 1, although the computer of FIG. 9 may also act as a server if appropriately programmed. The block diagram of a hardware platform of FIG. 10 represents an example of a mobile device, such as a tablet computer, smartphone or the like with a network interface to a wireless link, which may alternatively serve as a user terminal device for providing a user communication with a lighting device, such as 11. It is believed that those skilled in the art are familiar with the structure, programming and general operation of such computer equipment and as a result the drawings should be self-explanatory.

A server (see e.g. FIG. 8), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. A server, such as that shown in FIG. 8, may be accessible or have access to a lighting device 11 via the communication interfaces 117 of the lighting device 11. For example, the server may deliver in response to a user request a configuration information file. The information of a configuration information file may be used to configure a software configurable lighting device, such as lighting device 11, to set light output parameters comprising: (1) light intensity, (2) light color characteristic and (3) spatial modulation, in accordance with the lighting device configuration information. In some examples, the lighting device configuration information include an image for display by the lighting device and at least one level setting for at least one of beam steering or beam shaping by the lighting device. The configuration information file may also include information regarding the performance of the software configurable lighting device, such as dimming performance, color temperature performance and the like. The configuration information file may also include temporal information such as when to switch from one beam shape or displayed image to another and how long the transition from one state to another should take. Configuration data may also be provided for other states, e.g., for when the virtual luminaire is to appear OFF, in the same or a separate stored data file.

A computer type user terminal device, such as a desktop or laptop type personal computer (PC), similarly includes a data communication interface CPU, main memory (such as a random access memory (RAM)) and one or more disc drives or other mass storage devices for storing user data and the various executable programs (see FIG. 9). A mobile device (see FIG. 10) type user terminal may include similar elements, but will typically use smaller components that also require less power, to facilitate implementation in a portable form factor. The example of FIG. 10 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer hardware platform of FIG. 8 and the terminal computer platform of FIG. 9 are shown by way of example as using a RAM type main memory and a hard disk drive for mass storage of data and programming, whereas the mobile device of FIG. 10 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 9). The mobile device example in FIG. 10 uses a touchscreen type display, where the display is controlled by a display driver, and user touching of the screen is detected by a touch sense controller (Ctrlr). The hardware elements, operating systems and programming languages of such computer and/or mobile user terminal devices also are conventional in nature, and it is presumed that those skilled in the art are adequately familiar therewith.

The user device of FIG. 9 and the mobile device of FIG. 10 may also interact with the lighting device 11 in order to enhance the user experience. For example, third party applications stored as programs 127 may correspond to control parameters of a software configurable lighting device, such as image display and general illumination lighting distribution. In addition in response to the user controlled input devices, such as I/O of FIG. 9 and touchscreen display of FIG. 10, the lighting device, in some examples, is configured to accept input from a host of sensors, such as sensors 121. These sensors may be directly tied to the hardware of the device or be connected to the platform via a wired or wireless network. For example, a daylight sensor may be able to affect the light output from the illumination piece of the platform and at the same time change the scene of display as governed by the algorithms associated with the daylight sensor and the lighting platform. Other examples of such sensors can be more advanced in their functionality such as cameras for occupancy mapping and situational mapping.

The lighting device 11 in other examples is configured to perform visual light communication. Because of the beam steering (or steering) capability, the data speed and bandwidth can have an increased range. For example, beam steering and shaping provides the capability to increase the signal-to-noise ratio (SNR), which improves the visual light communication (VLC). Since the visible light is the carrier of the information, the amount of data and the distance the information may be sent may be increased by focusing the light. Beam steering allows directional control of light and that allows for concentrated power, which can be a requirement for providing highly concentrated light to a sensor. In other examples, the lighting device 11 is configured with programming that enables the lighting device 11 to "learn" behavior. For example, based on prior interactions with the platform, the lighting device 11 will be able to use artificial intelligence algorithms stored in memory 125 to predict future user behavior with respect to a space.

As also outlined above, aspects of the techniques form operation of a software configurable lighting device and any system interaction therewith, may involve some programming, e.g. programming of the lighting device or any server or terminal device in communication with the lighting device. For example, the mobile device of FIG. 10 and the user device of FIG. 9 may interact with a server, such as the server of FIG. 8, to obtain a configuration information file that may be delivered to a software configurable lighting device 11. Subsequently, the mobile device of FIG. 10 and/or the user device of FIG. 9 may execute programming that permits the respective devices to interact with the software configurable lighting device 11 to provide control commands such as the ON/OFF command or a performance command, such as dim or change beam steering angle or beam shape focus. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the software from one computer or processor into another, for example, from a management server or host computer of the lighting system service provider into any of the lighting devices, sensors, user interface devices, other non-lighting-system devices, etc. of or coupled to the system 11 via communication interfaces 117, including both programming for individual element functions and programming for distributed processing functions. Thus, another type of media that may bear the software/firmware program elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible or "storage" media, terms such as computer or machine "readable medium" refer to any medium that participates in providing instructions to a processor for execution.

The term "coupled" as used herein refers to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A lighting device, comprising:
    an image display device comprising one or more first light emitters configured to generate and emit light to display an image;
    a general illumination device collocated with the image display device, wherein the general illumination device comprises one or more second light emitters configured to generate and emit light for general illumination,
    a driver system coupled to the one or more first light emitters of the image, display device and coupled to the one or more second light emitters of the general illumination device,
    the driver system being configured to control the light generated by the general illumination device; and
    the driver system configured to control the light generated by the image display device;
    a memory;
    a processor having access to the memory and coupled to the driver system to control operation of the driver system; and
    programming in the memory, wherein execution of the programming by the processor configures the lighting device to perform functions including functions to:
    obtain an image selection and a general lighting generation selection as software control data;
    transform the image selection based on a desired color characteristic distribution, wherein the function to transform the image selection comprises functions to:

calculate a total red content, a total green content and a total blue content of the image selection, wherein:
- the total red content equals a summation of red pixel intensity values within the image selection;
- the total green content equals a summation of green pixel intensity values within the image selection; and
- the total blue content equals a summation of blue pixel values intensity within the image selection;

select an image transformation function based on a number of illumination requirements, the selected image transformation function includes unknown variables;

solve, based on the number of illumination requirements, the unknown variables of the selected image transformation function; and transform the image selection based on the solved image transformation function to venerate the transformed image selection;

modify the general lighting generation selection based on the transformed image selection;

present an image output, based on the transformed image selected, via the image display device; and control operation of the general illumination device via the driver system to emit light for general illumination from the general illumination device according to the modified general lighting generation selection.

2. The lighting device of claim 1, wherein:
the general illumination device comprises an array of light emitting diodes (LEDs);
the image display device comprises:
a first set of LED strips oriented in a first direction, each LED strip of the first set including a first number of LEDs evenly spaced along the respective LED strip; and
a second set of LED strips oriented in a second direction perpendicular to the first direction, each LED strip of the second set including a second number of LEDs evenly spaced along the respective LED strip, wherein:
the LED strips of the first set are spaced evenly apart from each other in parallel;
the LED strips of the second set are spaced evenly apart from each other in parallel; and
the first set of LED strips and the second set of LED strips form a grid; and
the general illumination device is located behind the image display device such that illumination generated by any one LED of the array of LEDs passes between a third number of LEDs of the grid of evenly spaced LEDs and is partially blocked by the third number of LEDs of the grid of evenly spaced LEDs, the third number including an equal number of LEDs of the first set of LED strips and LEDs of the second set of LED strips.

3. The lighting device of claim 1, further comprising:
collimating optics; and
a spatial light modulator,
wherein the collimating optics and the spatial light modulator are placed between the general illumination device and the image display device.

4. The lighting device of claim 3, wherein:
the collimating optics comprise total internal reflection lenses optically coupling, illumination light generated by the general illumination device to cells of the spatial light modulator; and
each cell of the spatial light modulator couples light to one or more transparent regions of the image display device.

5. The lighting device of claim 3, wherein the spatial light modulator is electro-wetting cell array.

6. The lighting device of claim 3, further comprising a partial diffuser located on an output side of the image display device.

7. The lighting device of claim 3, wherein:
the driver system is further coupled to the spatial light modulator; and
execution of the programming by the processor further configures the lighting device to perform a further function to control the spatial light modulator to control distribution of illumination generated by the general illumination device, generated illumination distribution being performed by at least one of shaping or steering of the generated illumination by the spatial light modulator.

8. The lighting device of claim 1, wherein:
one requirement is a target coordinated color temperature (CCT) of the image output presented by the image display device; and
presentation of the transformed image selection as the image output presented by the image display device produces a CCT matching the target CCT.

9. The lighting device of claim 1, wherein the function to transform the image selection further comprises a function to apply a second image transformation function, the second image transformation function performing a scaling of individual pixel intensity values.

10. The lighting device of claim 1, wherein the function to transform the image selection further comprises a function to calculate a figure of merit of the transformed image selection, the figure of merit measuring a difference between the image selection and the transformed image selection.

11. A method, comprising:
obtaining an image selection and a general lighting generation selection;
transforming the image selection based on a desired color characteristic distribution, wherein the transforming step comprises:
calculating a total red content, a total green content and a total blue content of the image selection, wherein:
- the total red content equals a summation of red pixel intensity values within the image selection;
- the total green content equals a summation of green pixel intensity values within the image selection; and
- the total blue content equals a summation of blue pixel intensity values within the image selection;

selecting an image transformation function based on a number of display requirements, the selected image transformation function includes unknown variables;

solving, based on the number of display requirements, the unknown variables of the selected image transformation function; and transforming the image selection based on the solve image transformation function to generate the transformed image selection;

modifying the general lighting generation selection based on the transformed image selection;

presenting, via a transparent image display device comprising one or more first light emitters configured to generate and emit light to display an image, an image output based on the transformed image selection; and controlling operation of a general illumination device comprising one or: ore second light emitters located behind the transparent image display device to emit light for general illumination from the general illumination device according to the modified general lighting generation selection.

12. The method of claim 11, wherein:
one requirement is a target coordinated color temperature (CCT) of the image output presented by the transparent image display device; and
presentation of the transformed image selection as the image output presented by the transparent image display device produces a CCT matching the target CCT.

13. The method of claim 11, wherein the transforming further comprises applying a second image transformation function, the second image transformation function performing a scaling of individual pixel intensity values.

14. The method of claim 11, wherein the transforming further comprises calculating a figure of merit of the transformed image selection, the figure of merit measuring a difference between the image selection and the transformed image selection.

15. The method of claim 11, further comprising:
controlling a spatial light modulator to control distribution of illumination generated by the general illumination device by at least one of shaping or steering the generated illumination, the collimating optics and the spatial light modulator being located between the general illumination device and the transparent image display device.

16. A non-transitory computer readable medium comprising a memory embodying programming instructions, wherein execution of the programming instructions by a processor configures the processor to perform the method of claim 11.

17. A lighting device, comprising:
an image display device comprising one or more first light emitters configured to generate and emit light to display an image;
a general illumination device collocated with the image display device, wherein the general illumination device comprises one, or more second light emitters configured to generate and emit light for general illumination,
a driver system coupled to the one or more first light emitters of the image display device and coupled to the one or more second light emitters of the general illumination device,
the driver system being configured to control the light generated by the general illumination device; and
the driver system being configured to control the light generated by the image display device;
a memory;
a processor having access to the memory and coupled to the driver system to control operation of the driver system: and
programming in the memory, wherein execution of the programming b the processor configures the lighting device to perform functions including functions to:
obtain an image selection and a general lighting generation selection as software control data;
transform the image selection based on a desired color characteristic distribution;
modify the general lighting generation selection based on the transformed image selection,
wherein: a pixel of the general illumination device corresponds to a number of pixels of the image display device, and the function to modify the general lighting generation selection comprises functions to:
for each pixel of the general illumination device and based on the transformed image selection:
calculate a total amount of brightness to he produced by the respective corresponding number of pixels of the image display device:
determine a measure of color content to be produced by the respective corresponding number of pixels of the image display device;
select a display function;
select, based on a number of display requirements, a lighting LED function, the lighting LED function including unknown variables corresponding to the number of display requirements;
solve the selected, lighting LED function to determine a value for each unknown variable, die solution representing an amount of brightness to he produced by the respective pixel of the general illumination device; and
maximize a ratio of:
a numerator equal to the total amount of brightness to be produced by the respective corresponding number of pixels of the image display device; to
a denominator equal to the amount of brightness, to be produced by the respective pixel of the general illumination device; and
generate, based on the maximized ratios, the modified general lighting generation selection;
present an image output, based on the transformed image selection, via the image display device; and
control operation of the general illumination device via the driver system to emit light for general illumination from the general illumination device according to the modified general lighting generation selection.

18. A method, comprising:
obtaining an image selection and a general lighting generation selection;
transforming the image selection based on a desired color characteristic distribution;
modifying the general lighting generation selection based on the transformed image selection, wherein: a pixel of the general illumination device corresponds to a number of pixels of the transparent image display device, and modifying the general lighting generation selection comprises:
for each pixel of the general illumination device and based on the transformed image selection:
calculating a total amount of brightness to he produced by the respective corresponding number of pixels of the transparent image display device;
determining a measure of color content to be produced by the respective corresponding number of pixels of the transparent image display device;
selecting a display function;
selecting, based on a number of illumination requirements, a lighting LED function, the lighting LED function including unknown variables corresponding to the number of illumination requirements;
solving the selected lighting LED function to determine a value for each unknown variable, the solution representing an amount of brightness to be produced by the respective pixel of the general illumination device; and maximizing a ratio of:
- a numerator equal to the total amount of brightness to he produced by the respective corresponding number of pixels of the transparent image display device; to
- a denominator equal to the amount of brightness to be produced by the respective pixel of the general illumination device; and generating, based on the maximized ratios, the modified general lighting generation selection;

presenting, via a transparent image display device comprising one or more first light emitters configured to generate and emit light to display an image, an image output based on the transformed image selection; and controlling operation of a general illumination device comprising one or more second light emitters located behind the transparent image display device to emit light for general illumination from the general illumination device according to the modified general lighting generation selection.

19. The method of claim 18 further comprising:

controlling a spatial light modulator to control distribution of illumination generated by the general illumination device by at least one of shaping or steering the generated illumination, the collimating optics and the spatial light modulator being located between the general, illumination device and the transparent image display device.

20. A non-transitory computer readable medium comprising a memory embodying programming instructions, wherein execution of the programming instructions by a processor configures the processor to perform the method of claim 18.

* * * * *